(12) United States Patent
Avellone et al.

(10) Patent No.: US 8,582,702 B2
(45) Date of Patent: Nov. 12, 2013

(54) ELECTRONIC DEVICE FOR RECEIVING A RADIO-FREQUENCY SIGNAL

(75) Inventors: Giuseppe Avellone, Gravina di Catania (IT); Oleksandr Gorbachov, Irvine, CA (US); Antonino Calcagno, Messina (IT); Salvatore Scaccianoce, Catania (IT)

(73) Assignees: STMicroelectronics S.r.l., Agrate Brianza (IT); STMicroelectronics Ltd., Kowloon (HK)

( * ) Notice: Subject to any disclaimer, the term of this patent is extended or adjusted under 35 U.S.C. 154(b) by 599 days.

(21) Appl. No.: 12/825,278

(22) Filed: Jun. 28, 2010

(65) Prior Publication Data

US 2010/0329321 A1    Dec. 30, 2010

(30) Foreign Application Priority Data

Jun. 30, 2009    (IT) .............................. MI2009A1159

(51) Int. Cl.
*H04B 1/10* (2006.01)
*H04L 1/00* (2006.01)

(52) U.S. Cl.
USPC ........... 375/346; 375/227; 375/285; 375/340; 375/345; 455/232.1; 455/226.3; 455/296

(58) Field of Classification Search
CPC ...... H04B 1/10; H04B 1/1027; H04B 17/005; H04B 17/0052; H04B 17/0055; H04B 1/71
USPC ................. 375/227, 345, 316, 285, 340, 346; 455/226.3, 232.1, 296
See application file for complete search history.

(56) References Cited

U.S. PATENT DOCUMENTS

| | | | |
|---|---|---|---|
| 6,426,983 B1 * | 7/2002 | Rakib et al. ................... | 375/346 |
| 6,466,629 B1 * | 10/2002 | Isaksson et al. .............. | 375/316 |
| 6,804,501 B1 * | 10/2004 | Bradley et al. ................ | 455/138 |
| 7,054,376 B1 * | 5/2006 | Rubinstain et al. ........... | 375/261 |
| 7,761,072 B2 * | 7/2010 | Fielder et al. .............. | 455/233.1 |
| 7,889,802 B2 * | 2/2011 | Yamagata et al. ............. | 375/260 |
| 8,223,901 B2 * | 7/2012 | Huttunen et al. ............. | 375/346 |
| 2003/0181180 A1 * | 9/2003 | Darabi et al. .............. | 455/234.1 |
| 2004/0229590 A1 * | 11/2004 | Kubo et al. .................... | 455/307 |
| 2005/0031057 A1 | 2/2005 | Messina et al. | |
| 2006/0084402 A1 | 4/2006 | Oshima et al. | |
| 2006/0128339 A1 * | 6/2006 | Petrovic ........................ | 455/296 |
| 2008/0139114 A1 * | 6/2008 | Ranganathan ............... | 455/41.1 |
| 2009/0216489 A1 * | 8/2009 | Mahadevan et al. .......... | 702/181 |
| 2010/0202493 A1 * | 8/2010 | Soliman et al. .............. | 375/130 |

FOREIGN PATENT DOCUMENTS

EP    1 610 469 A2    12/2005
WO   WO 2008/145799   * 12/2008

* cited by examiner

*Primary Examiner* — Sophia Vlahos
(74) *Attorney, Agent, or Firm* — Seed IP Law Group PLLC

(57) ABSTRACT

An electronic device includes an analog-to-digital converter adapted to receive a radio-frequency signal and adapted to provide therefrom a digital signal, wherein the radio-frequency signal may include an interference signal. The electronic device has a controller adapted to perform a digital measure on the digital signal and adapted to generate therefrom a selection signal having a first value indicating a non-interference condition in the radio-frequency signal and having a second value indicating an interference-condition in the radio-frequency signal. A selector is adapted to transmit the digital signal in case the selection signal has the first value and to transmit a signal replacing the digital signal in case the selection signal has the second value.

38 Claims, 9 Drawing Sheets

ELECTRONIC DEVICE FOR RECEIVING A RADIO-FREQUENCY SIGNAL

BACKGROUND

1. Technical Field

The present disclosure generally relates to the field of radio-frequency signal receivers. More particularly, the present disclosure relates to an electronic device with an automatic gain control for receiving radio-frequency signals, for example GPS (Global Positioning and navigation System).

2. Description of the Related Art

A radio-frequency signal receiver comprises an amplifier of the received radio-frequency signal and an analog-to-digital converter for converting the amplified radio-frequency signal into a digital signal.

The received radio-frequency signal comprises both the useful signal and noise. One of the most important noise contributions is that of high-power interference signals which can have a bandwidth which overlaps (at least partially) the bandwidth of the useful radio-frequency signal or of the high-power interference signals, which do not have a bandwidth overlapping the useful signal bandwidth, but that can cause a noise when non-linear effects are present in the radio-frequency signal receiver. For example, the useful signal is GPS and the interference signal is a radio-mobile signal including GSM (Global System for Mobile communication), EDGE (Enhanced Data rates for GSM Evolution), CDMA (Code Division Multiple Access) or WLAN (Wireless Local Area Network)-type.

The interference signal can have a high power and thus the received radio-frequency signal can assume values within a wide range; as a result, also the radio-frequency signal in input to the analog-to-digital converter can assume values within a wide range and the analog-to-digital converter can saturate.

Therefore it is typical to use an amplifier with an automatic gain control and to reduce the amplifier gain in order to decrease the value of the input signal to the analog-to-digital converter and to keep the values of the signal in input to the analog-to-digital converter within a determined range wherein the analog-to-digital converter works correctly, thereby preventing the analog-to-digital converter from saturating and also ensuring an efficient use of the dynamic range.

A known prior art to carry out the automatic control of the amplifier gain is as described in the US Patent Application USA having publication number US 2005/0031057-A1, wherein it is disclosed that the amplifier gain is controlled by means of the measure of the output power from the analog-to-digital converter estimated with the measure of the bit switching rate of the output signal from the analog-to-digital converter, within a determined time interval.

However, since the received radio-frequency useful signal received (for example, GPS) can be very weak, the reduction of the amplifier gain (caused by a high power interference signal, as explained above) also reduces excessively the power of the useful radio-frequency signal and thus the information carried by the useful radio-frequency signal cannot be detected correctly due to a high bit error rate.

A prior art for solving the problem of high-power interference signals in the radio-frequency signal is to detect, in the base-band module, the presence of the high-power interference signal and not to take into account the signal received from the radio-frequency module, which remains active, thereby dissipating power uselessly.

Another prior art is to detect in the base-band module the presence of the high-power interference signal and to switch off one or more blocks of the radio-frequency module (for example, the amplifier or the analog-to-digital converter). This prior art has the disadvantage that it requires to check periodically the presence of the high-power interference signal for reactivating the blocks of the radio-frequency module.

Both prior arts have the disadvantage of having, when the high-power interference signal arrives, an excessively too long time interval, wherein the base-band module processes erroneous samples.

The applicant has noticed that the prior arts have at least one of the following disadvantages:

they require too much time to detect the presence of high-power interference signals;

they may require too complex dedicated resources;

they may require the transmission of additional information from the radio-frequency module to the base-band module for the base-band detection of the presence of high-power interference signals;

they transmit unnecessarily erroneous bits from the radio-frequency module to the base-band module.

BRIEF SUMMARY

An embodiment of an electronic device according to the present disclosure has the following advantages:

it reduces the time required for detecting the presence of high-power interference signals;

it is easy to implement;

it does not require the transmission of additional information for detecting the presence of high-power interference signals;

it reduces the probability to reach the saturation of the analog-to-digital converter connected to the variable gain amplifier;

it reduces the transmission of erroneous bits from the radio-frequency modules to the base-band modules.

In an embodiment, an electronic device includes: an analog-to-digital converter adapted to receive a radio-frequency signal and adapted to provide therefrom a digital signal, wherein the radio-frequency signal includes an interference signal; a controller adapted to perform a digital measure on the digital signal and adapted to generate therefrom a selection signal having a first value indicating a non-interference condition in the radio-frequency signal and having a second value indicating an interference condition in the radio-frequency signal; a selector adapted to transmit the digital signal in case the selection signal has the first value and adapted to transmit a signal replacing the digital signal in case the selection signal has the second value. In an embodiment, the digital measure is a digital measure of the power of the digital signal; the interference condition is the detection by the controller that the value of the digital measure is greater or equal than an interference detection threshold; and the non-interference condition is the detection by the controller that the value of the digital measure is smaller than the interference detection threshold. In an embodiment, the digital measure is a digital measure of the power of the digital signal; the interference condition is the detection by the controller that the value of the digital measure is greater or equal than an interference detection threshold; and the non-interference condition is the detection by the controller that the value of the digital measure is smaller than an interference fading threshold, wherein the interference detection threshold is greater than the interference fading threshold. In an embodiment, the electronic device further includes a variable gain amplifier adapted to receive another radio-frequency signal and a gain control signal and adapted to provide therefrom the radio-frequency signal according to the gain control signal, wherein the controller is further adapted to: detect that the value of the digital measure is greater or equal than the interference detection threshold; and generate the gain control signal for reducing the gain of the variable gain amplifier. In an embodiment, the electronic device further includes a variable gain amplifier adapted to receive another radio-frequency signal and a gain control signal and adapted to provide therefrom the radio-frequency signal according to the gain control signal, wherein the controller is further adapted to: detect that the value of the digital measure is greater or equal than the interference detection threshold; store the gain value of the variable gain amplifier; and generate the gain control signal for keeping the gain of the variable gain amplifier equal to the stored gain value. In an embodiment, the controller is further adapted to: detect that the value of the digital measure is smaller than the interference fading threshold; generate the selection signal to the selector for selecting the digital signal; generate the gain control signal for controlling the gain of the variable gain amplifier, by increasing the gain of the amplifier if the value of the digital measure is smaller than a gain threshold and decreasing the gain of the amplifier if the value of the digital measure is higher than the gain threshold, wherein the gain threshold is smaller than the interference fading threshold. In an embodiment, the controller is further adapted to: detect that the value of the digital measure is smaller than the interference fading threshold and is greater than the gain threshold; and generate the selection signal to the selector for selecting the digital signal; and generate the gain control signal for keeping constant the gain of the variable gain amplifier. In an embodiment, the controller is further adapted to: detect that the value of the digital measure is smaller than a gain threshold; generate the selection signal to the selector for selecting the digital signal; and generate the gain control signal for controlling the gain of the variable gain amplifier, by increasing the gain of the amplifier if the value of the digital measure is smaller than the gain threshold and decreasing the gain of the amplifier if the value of the digital measure is higher than the gain threshold. In an embodiment, the digital measure is performed by a measure of a switching rate of at least one bit of the digital signal in a defined time unit. In an embodiment, the measure of the bit switching rate compared with the interference detection threshold and the measure of the bit switching rate compared with the interference fading threshold are performed taking into account at least one different bit of the digital signal. In an embodiment, the electronic device further includes a base-band module adapted to receive the digital signal or the replacement signal transmitted by the selector, wherein the controller is further adapted to generate an interrupt signal in case the selection signal has the second value and wherein the base-band module is further adapted to receive the interrupt signal. In an embodiment, the replacement signal is a pre-defined signal or a configured signal. In an embodiment, the electronic device is a GPS receiver. In an embodiment, an integrated circuit includes a GPS receiver having the electronic device.

In an embodiment, an electronic device comprises: an analog-to-digital converter configured to receive a radio-frequency signal, which may include an interference signal, and to generate therefrom a digital signal; a controller configured to perform a digital measure on the digital signal and to generate therefrom a selection signal having a first value indicating a non-interference condition in the radio-frequency signal and having a second value indicating an interference condition in the radio-frequency signal; and a selector configured to transmit the digital signal in case the selection signal has the first value and configured to transmit a signal replacing the digital signal in case the selection signal has the second value. In an embodiment, the digital measure is a digital measure of a power of the digital signal; and the controller is configured to generate the selection signal based on the digital measure and an interference detection threshold. In an embodiment, the interference condition occurs when a value of the digital measure is greater than or equal to the interference detection threshold; and the non-interference condition occurs when the value of the digital measure is smaller than the interference detection threshold. In an embodiment, the controller is configured to generate the selection signal based on the digital measure, the interference detection threshold and an interference fading threshold. In an embodiment, when a value of the digital measure is greater than or equal to the interference detection threshold, the controller is configured to set the selection signal to the second value; and when the value of the digital measure is smaller than the interference fading threshold, the controller is configured to set the selection signal to the first value, wherein the interference detection threshold is greater than the interference fading threshold. In an embodiment, the device further comprises a variable gain amplifier configured to receive another radio-frequency signal and a gain control signal and to generate therefrom the radio-frequency signal according to the gain control signal, wherein the controller is further configured to generate the gain control signal. In an embodiment, when a value of the digital measure is greater than or equal to the interference detection threshold, the controller is configured to generate the gain control signal to reduce a gain of the variable gain amplifier. In an embodiment, when a value of the digital measure is greater than or equal to the interference detection threshold, the controller is configured to: store a gain value of the variable gain amplifier; and generate the gain control signal for keeping the gain of the variable gain amplifier equal to the stored gain value. In an embodiment, when a value of the digital measure is smaller than the interference fading threshold, the controller is configured to: generate the selection signal to the selector to select the digital signal; and generate the gain control signal to control the gain of the variable gain amplifier, by increasing the gain of the amplifier if the value of the digital measure is smaller than a gain threshold and decreasing the gain of the amplifier if the value of the digital measure is higher than the gain threshold, wherein the gain threshold is smaller than the interference fading threshold and the interference fading threshold is smaller than the interference detection threshold. In an embodiment, when a value of the digital measure is smaller than the interference fading threshold and greater than the gain threshold, the controller is configured to: generate the selection signal to the selector to select the digital signal; and generate the gain control signal to keep constant the gain of the variable gain amplifier. In an embodiment, when a value of the digital measure is smaller than a gain threshold, the controller is configured to: generate the selection signal to the selector to select the digital signal; and generate the gain control signal for controlling the gain of the variable gain amplifier, by increasing the gain of the amplifier if the value of the digital measure is smaller than the gain threshold and decreasing the gain of the amplifier if the value of the digital measure is higher than the gain threshold. In an embodiment, the controller is configured to perform the digital measure by measuring a switching rate of at least one bit of the digital signal in a defined time period. In an embodiment, the controller is configured to: perform the digital measure by: measuring a first switching rate of at least one bit of the digital signal; and measuring a second switching rate of at least one different bit of the digital signal; compare the first switching rate with the interference detection threshold; and compare the second switching rate with the interference fading threshold. In an embodiment, the electronic device further comprises: a base-band module configured to receive the digital signal or the replacement signal transmitted by the selector, wherein the controller is further configured to generate an interrupt signal when the selection signal has the second value and wherein the base-band module is configured to receive the interrupt signal. In an embodiment, the replacement signal is a pre-defined signal. In an embodiment, the electronic device further comprises: a global positioning module. In an embodiment, the electronic device is implemented in an integrated circuit.

In an embodiment, a system comprises: a base-band module; and a radio-frequency module comprising: means for converting a radio-frequency signal to a digital signal; means for detecting an interference condition in the radio-frequency signal based on the digital signal and generating a selection signal based on whether an interference condition is detected; and means for transmitting one of the digital signal and a replacement signal to the base-band module based on the selection signal. In an embodiment, the means for detecting is configured to measure a power of the digital signal and generate the selection signal based on the measured power and an interference detection threshold. In an embodiment, the means for detecting is configured to generate the selection signal based on the measure power, the interference detection threshold and an interference fading threshold. In an embodiment, the system further comprises: a variable gain amplifier coupled to the means for converting and configured to receive an input radio-frequency signal and a gain control signal and to output the radio-frequency signal, wherein the means for detecting is further configured to generate the gain control signal. In an embodiment, the replacement signal is a configured signal. In an embodiment, the system further comprises: means for determining a global position.

In an embodiment, a method comprises: converting a radio-frequency signal to a digital signal; converting a radio-frequency signal to a digital signal; performing a digital measure on the digital signal; detecting an interference condition in the radio-frequency signal based on the digital measure; and transmitting one of the digital signal and a replacement signal based on whether the interference condition is detected. In an embodiment, the performing a digital measure comprises measuring a power of the digital signal and the detecting an interference condition comprises comparing the measured power to an interference detection threshold. In an embodiment, the detecting an interference condition further comprises comparing the measured power to an interference fading threshold. In an embodiment, the method further comprises: amplifying the radio-frequency signal prior to converting the radio-frequency signal to the digital signal; and controlling a gain of the amplification. In an embodiment, controlling the gain comprises reducing the gain when an interference condition is detected. In an embodiment, controlling the gain comprises maintaining a previous gain when an interference condition is detected. In an embodiment, controlling the gain comprises: measuring at least one characteristic of the digital signal; and generating a gain control signal based on the at least one measured characteristic, an interference detection threshold and a gain threshold. In an embodiment, generating the gain control signal is based on the at least one measured characteristic, the interference detection threshold, the gain threshold and an interference fading threshold. In an embodiment, the method further comprises: detecting whether the replacement signal was transmitted; and when the replacement signal was not transmitted, demodulating the transmitted signal.

In an embodiment, a computer-readable memory medium's contents cause at least one processing device to perform a method, the method comprising: converting a radio-frequency signal to a digital signal; performing a digital measure on the digital signal; detecting an interference condition in the radio-frequency signal based on the digital measure; and transmitting one of the digital signal and a replacement signal based on whether the interference condition is detected. In an embodiment, the performing the digital measure comprises measuring a power of the digital signal; and the detecting an interference condition comprises comparing the measured power to an interference detection threshold. In an embodiment, the method further comprises: amplifying the radio-frequency signal prior to converting the radio-frequency signal to the digital signal; and controlling a gain of the amplification based on whether the interference condition is detected.

BRIEF DESCRIPTION OF THE SEVERAL VIEWS OF THE DRAWINGS

Further features and benefits of the disclosure will result from the following description of an embodiment and variants thereof provided as a way of example with reference to the attached drawings, wherein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
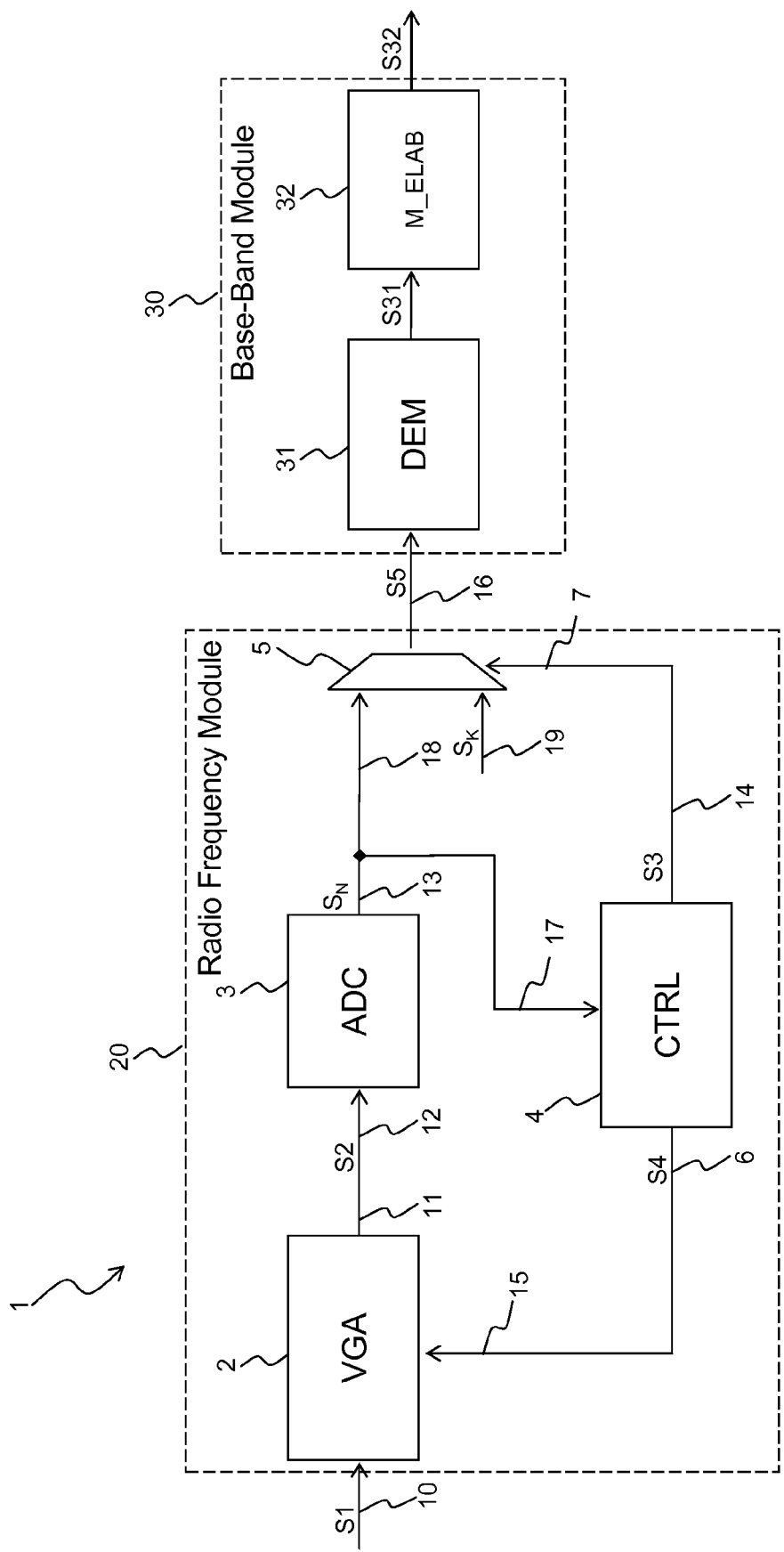
FIG. 1 schematically shows an electronic device according to the disclosure.

Referring to FIG. 1, an embodiment of an electronic device 1 according to the disclosure is shown. The electronic device 1 may be part of a system, such as a GPS system, and may be implemented in the form of an integrated circuit.

The electronic device 1 comprises a radio-frequency module 20 and a base-band module 30 connected to the radio-frequency module 20.

The radio-frequency module 20 comprises a variable gain amplifier 2, an analog-to-digital converter 3, a controller 4 and a selector 5.

The base-band module 30 comprises a demodulator 31 and a processing module 32.

The variable gain amplifier 2 comprises:
- a first input terminal 10 for receiving a radio-frequency signal S1: for example, the radio-frequency signal S1 comprises a GPS-type useful signal;
- a second input terminal 15 for receiving a gain control signal S4;
- an output terminal 11 for generating an amplified radio-frequency signal S2.

Radio-frequency signal S1 is typically a signal with a frequency greater than 1 MHz. For example, the radio-frequency signal may have a carrier frequency between 1573 Mhz and 1577 Mhz.

The variable gain amplifier 2 is such that it receives the radio-frequency signal S1, is such that it receives the gain control signal S4 and is such that it generates the amplified radio-frequency signal S2 obtained from the radio-frequency signal S1 by means of a variable gain amplification as a function of the gain control signal S4. The analog-to-digital converter 3 comprises an input terminal 12 connected to the output terminal 11 of the amplifier 2 for receiving the amplified radio-frequency signal S2 and comprises an output terminal 13 for generating a N-bit digital signal $S_N$ by means of an analog-to-digital conversion. For example, in case of a received GPS-type radio-frequency signal S1, the bit number N may be equal to 3.

The controller 4 comprises an input terminal 17 connected to the output terminal 13 of the analog-to-digital converter 3 in order to receive at least part of the bits of the digital signal $S_N$, comprises a first output terminal 14 for generating a selection signal S3 and comprises a second output terminal 6 connected to the input terminal 15 of the amplifier 2 to generate the gain control signal S4.

Figure 6A:
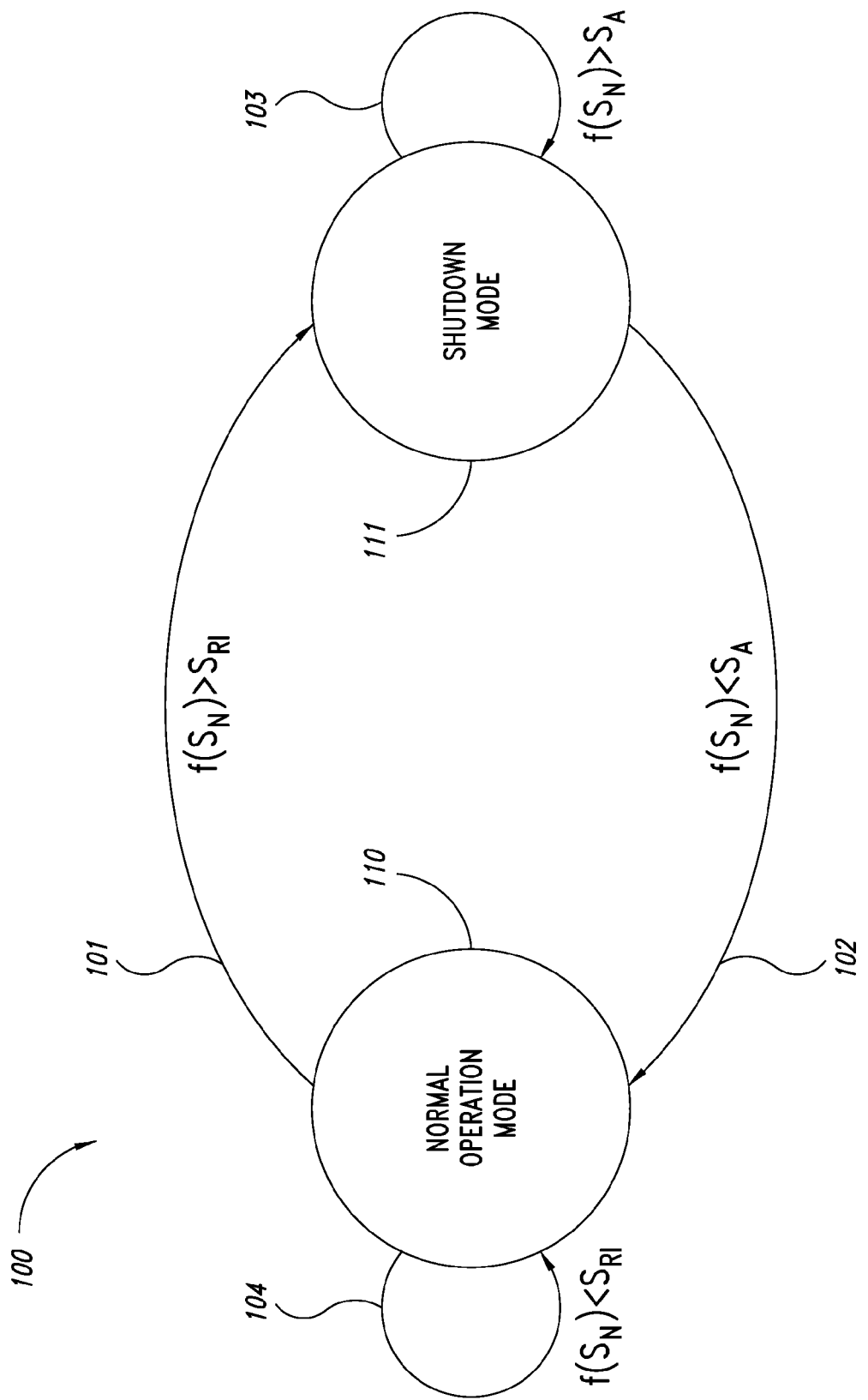
FIGS. 6A and 6B schematically show an embodiment of a state machine implemented in the controller inside the electronic device according to an embodiment of the disclosure.

The controller 4 has a normal operation mode and a shutdown mode: this may be achieved using a first state machine implemented in the controller 4. FIG. 6A schematically shows an embodiment of a first state machine 100 comprising the state 110 which implements the normal operation mode and the state 111 which implements the shutdown mode.

Figure 6B:
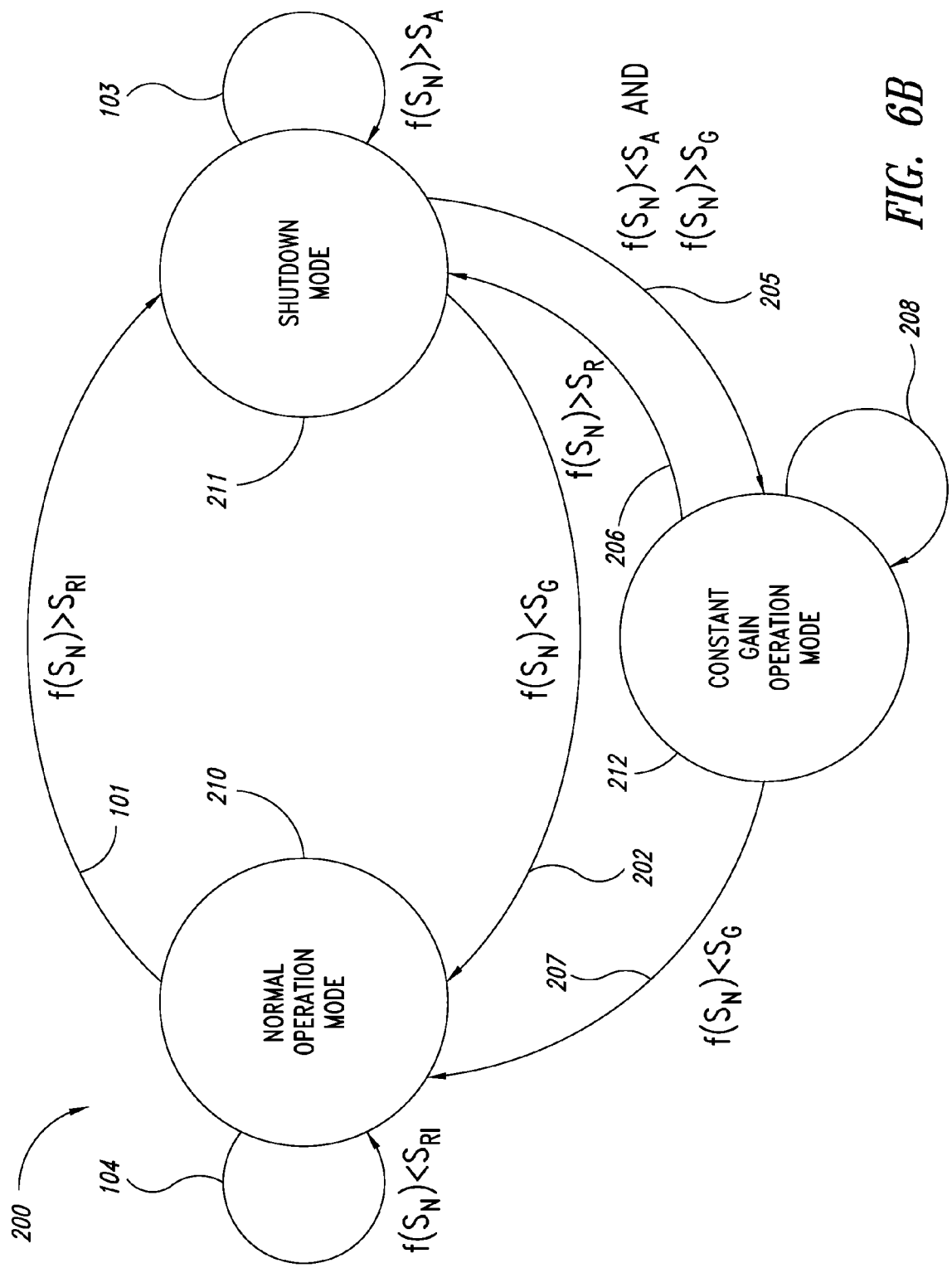

Preferably, the controller 4 has also an optional constant gain operation mode: this may be achieved using a second state machine implemented in the controller 4. FIG. 6B schematically shows the diagram of an embodiment of a second state machine 200 comprising the state 210, which implements the normal operation mode, the state 211, which implements the shutdown mode and the state 212, which implements the constant gain operation mode.

In the normal operation mode 110 and 210, the controller 4 is such to carry out a digital measure on the digital signal $S_N$ and it is such to provide the gain control signal S4 to control the gain of the amplifier 2, increasing the gain if the value of the digital measure is lower than a first threshold and decreasing the gain if the value of the digital measure is greater than or equal to the first threshold. The first threshold may be hereinafter referred to as the "gain threshold".

In an embodiment, in the normal operation mode 110 and 210, the digital measure may be a measure of the power of the digital signal $S_N$.

Advantageously, in an embodiment in the normal operation mode 110 and 210, the digital measure of the power of the digital signal $S_N$ may be carried out considering one or more bits of the digital signal $S_N$, counting (in case of one bit) in a determined time interval the number of times wherein the bit of the digital signal $S_N$ is equal to the high logic value (i.e., "1") and comparing the value obtained from the counting with respect to the gain threshold: such a value of the counting will be referred to hereinafter as "bit switching rate" of the digital signal $S_N$ and it will be referred to as $f(S_N)$ to indicate that it is a value calculated as a function of one or more bits of the digital signal $S_N$. Therefore an embodiment of the controller 4 may be configured that it provides a gain control signal S4 such to increase the gain of the amplifier 2 when the value of the bit switching rate $f(S_N)$ of the digital signal $S_N$ is lower than the gain threshold and such to decrease the gain of the amplifier 2 when the bit switching rate $f(S_N)$ is greater than or equal to the gain threshold.

Moreover, in the normal operation mode 110 and 120 an embodiment of the controller 4 is such to carry out a digital measure on the digital signal $S_N$ and it is such to provide the selection signal S3 having a second value (for example, a low logic value) in case the digital measure value is equal to or greater than a second threshold (greater than the gain threshold). The second threshold is selected so that a value of the measure of the bit switching rate greater than the second threshold is indicative of the presence of a high-power interference signal contained in the radio-frequency signal S1, as it will be explained more in detail below. Therefore the second threshold will be hereinafter referred to as an "interference detection threshold"; moreover the detection by the controller 4 of the digital measure value greater than or equal to the interference detection threshold is referred to as "interference condition", whereas the detection by the controller 4 of the digital measure value lower than the interference detection threshold is referred to as "non-interference condition".

In an embodiment, in the normal operation mode 110 and 210 the digital measure is a measure of the power of the digital signal $S_N$.

Advantageously, in an embodiment in the normal operation mode 110 and 210 the digital measure of the power of the digital signal $S_N$ may be carried out by measuring the bit switching rate of the digital signal $S_N$, i.e., considering one or more bits of the digital signal $S_N$, counting (in case of one bit) in a determined time interval the number of times wherein the bit is equal to the high logic value (i.e., "1") and comparing the value obtained by the counting with respect to the interference detection threshold. Therefore in an embodiment in the normal operation mode 110 and 210 the controller 4 is such to provide the selection signal S3 having the second value in case the value of the bit switching rate of the signal $S_N$ is equal to or greater than the interference detection threshold.

In an embodiment, in the shutdown mode 111 the controller 4 is such to carry out a digital measure on the digital signal $S_N$ and it is such to provide the selection signal S3 having a first value (for example, a high logic value) in case the value of the digital measure is lower than the interference detection threshold $S_{RI}$.

In a embodiment, in the shutdown mode 111, the controller 4 is such to carry out a digital measure on the digital signal $S_N$ and it is such to provide the selection signal S3 having the first value (for example, a high logic value) in case the value of the digital measure is equal to or lower than a third threshold, which is lower than the interference detection threshold and greater than the gain threshold. The third threshold may be chosen so that a value of the measure of the bit switching rate, lower than the third threshold, is indicative of the of the fading of the power of the high-power interference signals contained in the radio-frequency signal S1, as it will explained in more detail below. Therefore the third threshold is referred to hereinafter as the "interference fading threshold"; moreover in this case, an "interference condition" means the detection by the controller 4 of the value of the digital measure greater than or equal to the interference detection threshold, while "non-interference condition" means the detection by the controller 4 of the value of the digital measure lower than or equal to the interference fading threshold.

The use of the interference fading threshold (different from the interference detection threshold and with a lower value) in the shutdown mode 111 has the advantage of avoiding to perform a transition from the shutdown mode 111 to the normal operation mode 110 or 210 in case the interference signal has one or more high-to-low and low-to-high intensity oscillations, in a short time interval.

In an embodiment, in the shutdown mode 111, the digital measure is a measure of the power of the digital signal $S_N$.

In an embodiment, in the shutdown mode 111, the digital measure of the power of the digital signal $S_N$ is carried out by measuring the bit switching rate of the digital signal $S_N$, i.e., considering one or more bits of the digital signal $S_N$, counting (in case of one bit) in a determined time interval the number of times the bit is equal to the high logic value (i.e.,"1") and comparing the value obtained by the counting with respect to the interference fading threshold. Therefore in an embodiment, in the shutdown mode 111 the controller 4 is such to provide the selection signal S3 having the first value in case the value of the bit switching rate of the signal $S_N$ is equal to or lower than the interference fading threshold.

In an embodiment, the value of the gain threshold of the interference detection threshold and of the interference fading threshold is pre-defined (i.e., assigned before the operation of device 1) or it can be configured (i.e., it can be changed also during the operation of device 1).

The selector 5 is such to transmit the digital signal $S_N$ in case the selection signal S3 has the first value (for example, a high logic value $V_H$) provided by the controller 4 and it is such to transmit a signal replacing the digital signal $S_N$ (indicated with $S_K$ in FIGS. 1-5 and indicated hereinafter as "replacement signal $S_K$") in case the selection signal S3 has the second value (for example, a low logic value $V_L$) provided by the controller 4. In particular, FIG. 1 shows that the selector 5 comprises a first input terminal 18 connected to the output terminal 13 of the analog-to-digital converter 3 for receiving the digital signal $S_N$, a second input terminal 19 for receiving the replacement signal $S_K$, a third input terminal 7 connected to the output terminal 14 of the controller 4 for receiving the selection signal S3 and an output terminal 16 for transmitting a selected signal S5. The selected signal S5 is obtained by means of the selection between the digital signal $S_N$ and the replacement signal $S_K$, according to the value of the selection signal S3 received on the third input terminal; in particular, the selector 5 is such to transmit the digital signal $S_N$ as the selected signal S5, in case the selection signal S3 has the first value provided by the controller 4 (i.e., in case the value of digital measure is lower than the interference detection threshold or is lower than or equal to the interference fading threshold) and it is such to transmit as the selected signal S5 the replacement signal $S_K$, in case the selection signal S3 has the second value provided by the controller 4 (i.e., in case the value of the digital measure is greater than or equal to the interference detection threshold).

The replacement signal $S_K$ may be, for example, a pre-defined signal (i.e., assigned before the operation of the electronic device 1) or a signal configured during the operation of the electronic device 1; for example, the replacement signal $S_K$ is a sequence of alternate low (i.e., "0") and high (i.e., "1") logic values (which means a string of bit like "010101 . . . ") or a sequence of low logic values (which means a string of bit like "000000").

In an embodiment, in case the value of the digital measure is greater than or equal to the interference detection threshold, the controller 4 is such to generate also an interrupt signal (not shown in FIG. 1) indicating the presence of a high power interference signal included into the radio-frequency signal S1, wherein said interrupt signal is received by the base-band module 30.

In an embodiment, the controller 4 is such to carry out a digital measure of the digital signal $S_N$ (for example, a measure of the power), it is such to provide the selection signal S3 so that the selector 5 is such to transmit the digital signal $S_N$ as the selected signal 5, both in case the value of the digital measure is greater than or equal to the interference detection signal and in case the value of the digital measure is lower than the interference detection threshold; moreover, in case the value of the digital measure is greater than or equal to the interference detection threshold, the controller 4 is such to generate an interrupt signal (not shown in FIG. 1) indicating the presence of a high-power interference signal in the radio-frequency S1, where said interrupt signal is received by the base-band module 30.

The demodulator 31 comprises an input terminal connected to the output terminal 16 of the selector 5 for receiving the selected signal S5 and comprises an output terminal for transmitting a demodulated signal S31 obtained by the selected signal S5 by means of a demodulation from signal S5 to signal S31; the demodulator comprises, possibly, also blocks for effecting the conversion from the signal S5 to an intermediate frequency signal, which is then converted into the signal S31 from the intermediate frequency to the base-band.

The processing module 32 comprises an input terminal connected to the output terminal of the demodulator 31 to receive the demodulated signal S31 and comprises an output terminal to transmit a processed signal S32 obtained from the demodulated signal S31 by means of a processing thereof; for example, the processing module 32 carries out the function of information bit extraction.

Figure 2:
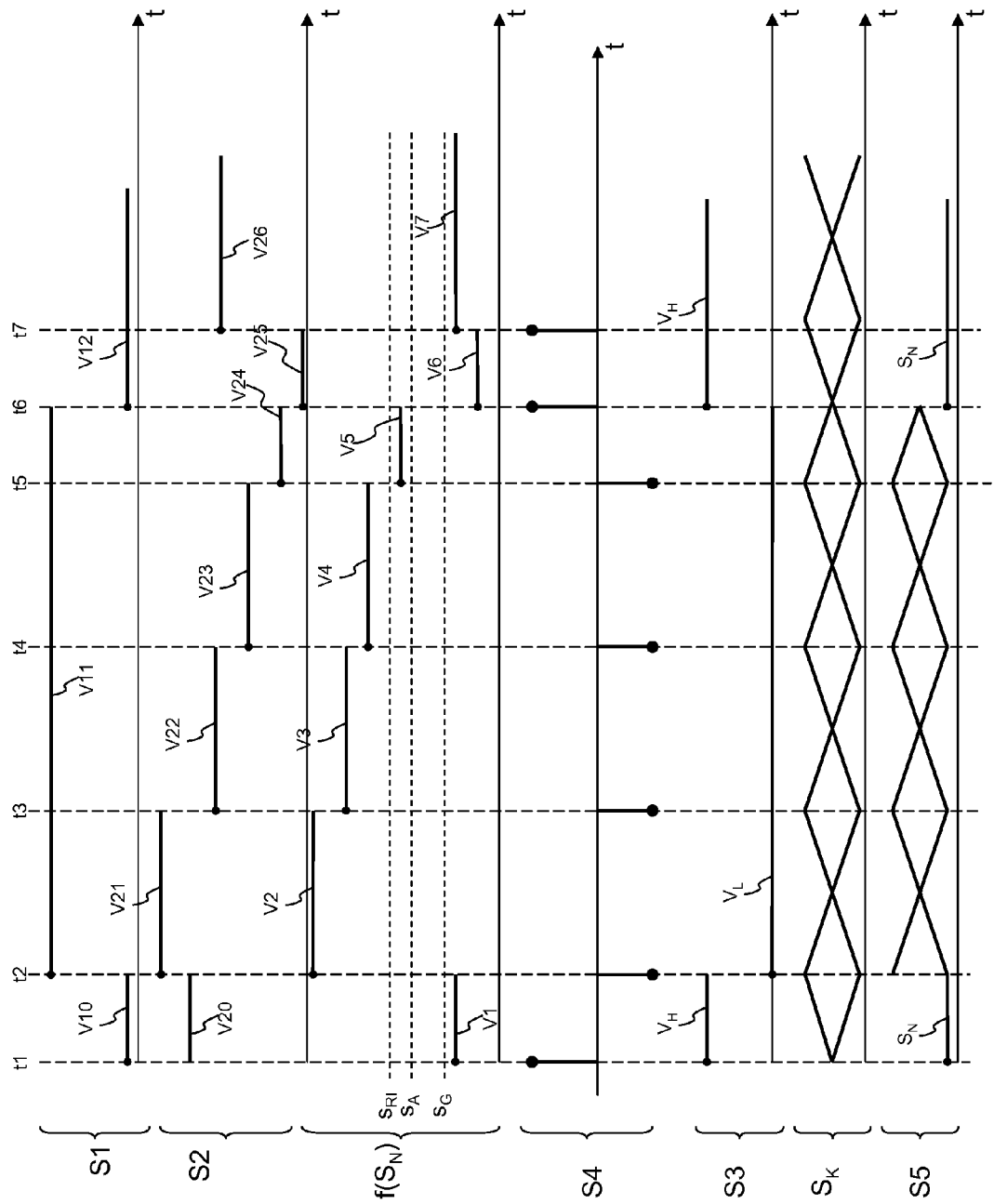
FIG. 2 schematically shows the trend of some signals in the electronic device according to an embodiment of the disclosure.

It will be now described the operation of the electronic device 1 according to a first example embodiment of the disclosure, referring also to FIGS. 1, 2 and 6A.

It is supposed that the selector 5 selects, as the selected signal S5 on its output 16, the signal $S_N$ in case the selection signal S3 has a high logic value $V_H$ and selects the replacement signal $S_K$ in case the selection signal S3 has a low logic value $V_L$. It is to be observed that selector 5 means, more generally, circuitry configured to transmit the digital signal $S_N$ in case the selection signal S3 has the first value (for example a high logic value $V_H$) provided by the controller 4 and configured to transmit the replacement signal $S_K$ in case the selection signal S3 has the second value (for example a low logic value $V_L$) provided by the controller 4.

It is also supposed to carry out the measure of the bit switching rate of the digital signal $S_N$ (indicated with $f(S_N)$ in FIG. 2), but the disclosure can also be applied, more generally, to a digital measure on the digital signal $S_N$.

It is also supposed that in the normal operation mode 110 the controller 4 carries out the comparison between the value of the measure of the bit switching rate $f(S_N)$ of the digital signal $S_N$ and the interference detection threshold (indicated with $S_{RI}$ in FIG. 2) and that in the shutdown mode 111 the controller 4 carries out the comparison between the measure of the bit switching rate $f(S_N)$ and the interference fading threshold (indicated with $S_A$ in FIG. 2); the disclosure, however, is applicable also to the case wherein the controller 4 carries out the comparison between the value of the measure of the bit switching rate $f(S_N)$ and the interference detection threshold both in the normal operation mode 110 and in the shutdown mode 111.

It is supposed to start from the condition wherein the controller 4 is in the normal operation mode 110.

At the starting time $t_1$ the amplifier 2 receives on its input 10 the radio-frequency signal S1 with value V10 and generates the amplified radio-frequency signal S2 with value V20 (greater than V10).

The analog-to-digital converter 3 receives the amplified radio-frequency signal S2 with a value V20 and converts it into a digital one, generating the digital signal $S_N$.

The controller 4 receives at least part of the bits of the digital signal $S_N$, measures the bit switching rate $f(S_N)$ of the signal $S_N$ and detects that the bit switching rate $f(S_N)$ assumes a value $V_1$ lower than the interference detection threshold $S_{RI}$. The controller 4 remains in the same normal operation mode 110: this is shown in the state diagram of FIG. 6A, wherein the arrow 104 is present which indicates the permanence in the state 110 with the normal operation mode, when occurs the condition (indicated with $f(S_N)<S_{RI}$) that the bit switching rate $f(S_N)$ is lower than the interference detection threshold $S_{RI}$.

In the normal operation mode 110 and in the condition wherein the value of the bit switching rate $f(S_N)$ is lower than the interference detection threshold $S_{RI}$, the controller 4 generates a high value $V_H$ of the selection signal S3 and the selector 5 selects, as the selected signal S5 on its output 16, the digital signal $S_N$.

Moreover, since the value $V_1$ of the bit switching rate $f(S_N)$ is also lower than the gain threshold $S_G$, the controller 4 measures the value $V_1$ of the bit switching rate $f(S_N)$ and it provides therefrom to the amplifier 2 the gain control signal S4 which increases the amplifier 2 gain value (this is schematically indicated in FIG. 2 with a sample of the signal S4 at the time $t_1$ with a positive value).

At the time $t_2$ the amplifier 2 receives on its output 10 a high-power interference signal contained in the radio-frequency signal S1: the interference signal affects the radio-frequency signal S1, whose value changes from V10 at the time $t_1$ to V11 at the time $t_2$ (V11 being much greater than V10). It is also supposed that the interference signal has a burst trend over the time, i.e., at a certain time is present ($t_2$ in FIG. 2) and it disappears after a certain time ($t_6$ in FIG. 2), to appear again subsequently; for sake of simplicity, FIG. 2 shows the effect of only one burst (comprised between the times $t_2$ and $t_6$) of the interference signal on the trend of the radio-frequency signal S1, but more generally the radio-frequency signal S1 can comprise several bursts.

The amplifier 2 generates the amplified radio-frequency signal S2 with value V21 (greater than V11).

The analog-to-digital converter 3 receives the amplified radio-frequency signal S2 with value V21 and converts it into a digital one, generating the digital signal $S_N$.

The controller 4 receives at least part of the bits of the digital signal $S_N$, measures the bit switching rate $f(S_N)$ and detects that the bit switching rate $f(S_N)$ assumes a value $V_2$ greater than the interference detection threshold $S_{RI}$. The controller 4 enters the shutdown mode: this is shown in the state diagram of FIG. 6A, wherein the arrow 101 is present, which indicates a transition from state 110 with normal operation mode to state 111 with shutdown mode, when it occurs the condition (indicated with $f(S_N)>S_{RI}$) that the value of the bit switching rate $f(S_N)$ is greater than the interference detection threshold $S_{RI}$.

In the shutdown mode 111 and in the condition wherein the bit switching rate $f(S_N)$ is greater than the interference detection threshold $S_{RI}$, the controller 4 generates a low value $V_L$ of the selection signal S3 and the selector 5 selects as the selected signal S5 on its output 16 the replacements signal $S_K$.

Therefore at the instant $t_2$ wherein the interference signal is detected, the base-band module 30 receives the replacement signal $S_K$, thereby reducing the time wherein the transmission of erroneous bit from the radio-frequency module 20 to the base-band module 30 occurs; moreover, also the base-band module 30 is capable of detecting the presence of the interference signal, by receiving the replacement signal $S_K$ (for example, a pre-defined bit sequence and thus known to the base-band module 30).

Moreover, at time $t_2$ the controller 4 provides to the amplifier 3 the gain control signal S4 to decrease the gain value of the amplifier 2 (this is schematically indicated in FIG. 2 with a sample of signal S4 at the time $t_2$ with a negative value).

In an embodiment, the controller 4 stores the value of the amplifier 2 gain at the time $t_2$ wherein the interference signal is detected.

The base-band module 30 thus receives the replacement signal $S_K$: since the replacement signal $S_K$ is a sequence of known bits, the base-band module 30 quickly recognizes that the signal S5 contains the replacement signal $S_K$ which does not carry any valid information bits. This has the advantage that the base-band module is capable of neglecting the bits of the signal S5 (since it receives the replacement signal $S_K$, which are not valid information bits) or the base-band module processes the bits of the replacement signal $S_K$ taking into account, however, that they are not valid information bits (for example, they cannot be used to keep the base-band module 30 locked). At the time $t_3$ the amplifier 2 continues to receive on its input 10 the high-power interference signal and for sake of simplicity it is supposed that the radio-frequency signal S1 keeps the value V11.

Since at time $t_2$ the controller 4 has provided the gain control signal S4 to decrease the gain of amplifier 2, at time t3 the amplifier 2 generates the amplified radio-frequency signal S2 with value V22 lower than V21.

The analog-to-digital converter 3 receives the amplified radio-frequency signal S2 with the value V22 and converts it into a digital one, generating the digital signal $S_N$.

The controller 4 receives at least part of the bits of the digital signal $S_N$, measures the bit switching rate $f(S_N)$ of the signal $S_N$ and detects that the bit switching rate $f(S_N)$ assumes a value $V_3$ greater than the interference fading threshold $S_A$. The controller 4 remains then in the shutdown mode 111: this is shown in the state diagram of FIG. 6A, wherein the arrow 103 is present which indicates the permanence in the state 111 with the shutdown mode, when it occurs the condition (indicated with $f(S_N)<S_A$) that the value of the bit switching rate $f(S_N)$ is greater than the interference fading threshold $S_A$.

In the shutdown mode 111 and in the condition wherein the value of the bit switching rate $f(S_N)$ is greater than the interference fading threshold $S_A$, the controller 4 continues to generate a low value $V_L$ of the selection signal S3 and the selector 5 continues to select the replacement signal $S_K$ as the selected signal S5 on its output 16.

Moreover, the controller 4 continues to provide to the amplifier 2 the gain control signal S4 to decrease the gain value of amplifier 2 (this is schematically indicated in FIG. 2 with a sample of signal S4 at the time $t_3$ with a negative value).

At times $t_4$ and $t_5$ the amplifier 2 continues to receive a high-power interference signal on its output 10 and thus the operation of the electronic device according to the first embodiment of the disclosure at times $t_4$ and $t_5$ is similar to that of time $t_3$.

The controller 4 continues to detect that the bit switching rate $f(S_N)$ is still assuming values ($V_4$ and $V_5$) greater than the interference fading threshold $S_A$ and thus the controller 4 remains in the shutdown mode 111; the controller 4 continues to generate a low value $V_L$ of the selection signal S3 and the selector 5 continues to select the replacement signal $S_K$ as the selected signal S5 on its output 16.

Moreover, the controller 4 continues to provide the gain control signal S4 to the amplifier 2 in order to decrease the gain value of the amplifier 2: therefore the amplifier 2 generates the amplified radio-frequency signal S2 with decreasing values ($V_{23}$ and $V_{24}$).

At the time $t_6$ the high-power interference signal disappears (or considerably fades): the amplifier 2 receives the radio-frequency signal S1 which switches from the value V11 at the time $t_5$ to the value V12 at the time $t_6$ (with V12 much lower than V11).

The amplifier 2 generates the amplified radio-frequency signal S2 with value V25 (greater than V12).

The analog-to-digital converter 3 receives the amplified radio-frequency signal S2 with the value V25 and converts it into a digital one, generating the digital signal $S_N$.

The controller 4 receives at least part of the bits of the digital signal $S_N$, measures the bit switching rate $f(S_N)$ and detects that the bit switching rate $f(S_N)$ assumes a value $V_6$ lower than the interference fading threshold $S_A$. The controller 4 switches from the shutdown mode 111 to the normal operation mode 110: this is shown in the state diagram of FIG. 6A, wherein the arrow 102 is present which indicates a transition from the state 111 with shutdown mode to the state 110 with the normal operation mode, when it occurs the condition (indicated with $f(S_N)<S_{RI}$) that the value of the bit switching rate $f(S_N)$ is lower than the interference fading threshold $S_A$. The use of the interference fading threshold $S_A$ with a value lower than the value of the interference detection threshold $S_{RI}$ allows to filter possible oscillations of the values of the bit switching rate $f(S_N)$ (caused by oscillations of the power of the interference signal), thus avoiding to have repeated transitions from the shutdown mode 111 to the normal operation mode 110 and vice versa.

In the shutdown mode 111 and in the condition wherein the value of the bit switching rate $f(S_N)$ is lower than the interference fading threshold $S_A$, the controller 4 generates a high value $V_H$ of the selection signal S3 and the selector 5 selects as the selected signal S5 on its output 16 the digital signal $S_N$. Moreover, the controller 4 provides the gain control signal S4 to the amplifier 2 to control the gain value of the amplifier 2: in particular, since the value $V_6$ of the bit switching rate $S_G$ is also lower than the gain threshold $S_G$, the controller 4 measures the value $V_6$ of the bit switching rate $f(S_N)$ and it provides therefrom to the amplifier 2 the gain control signal S4 which increases the gain value of the amplifier 2 (this is schematically indicated in FIG. 2 with a sample of signal S4 at time $t_6$ with a positive value).

At the time $t_7$ the amplifier 2 continues to receive the radio-frequency signal S1 with value V12 on its input 10.

The amplifier 2 generates the amplified radio-frequency signal S2 with the value V26 (greater than V12 and V25).

The analog-to-digital converter 3 receives the amplified radio-frequency signal S2 with value V26 and converts it into a digital one, generating the digital signal $S_N$.

The controller 4 receives at least part of the bits of the digital signal $S_N$, measures the bit switching rate $f(S_N)$ and detects that the bit switching rate $f(S_N)$ continues to assume a value $V_7$ lower than the interference detection threshold $S_{RI}$. Therefore the controller 4 remains in the same normal operation mode 110: the controller 4 continues to generate a high value $V_H$ of the selection signal S3 and the selector 5 continues to select the digital signal $S_N$ as the selected signal S5 on its output 16. Moreover the controller 4 continues to provide the gain control signal S4 to the amplifier 2, in order to control the gain value of the amplifier 2: in particular, since the value $V_7$ of the bit switching rate $f(S_N)$ is also lower than the gain threshold $S_G$, the controller 4 provides to the amplifier 2 the gain control signal S4 which increases the gain value of the amplifier 2 (this is schematically indicated in FIG. 2 with a sample of signal S4 at time $t_7$ with a positive value).

Figure 3:
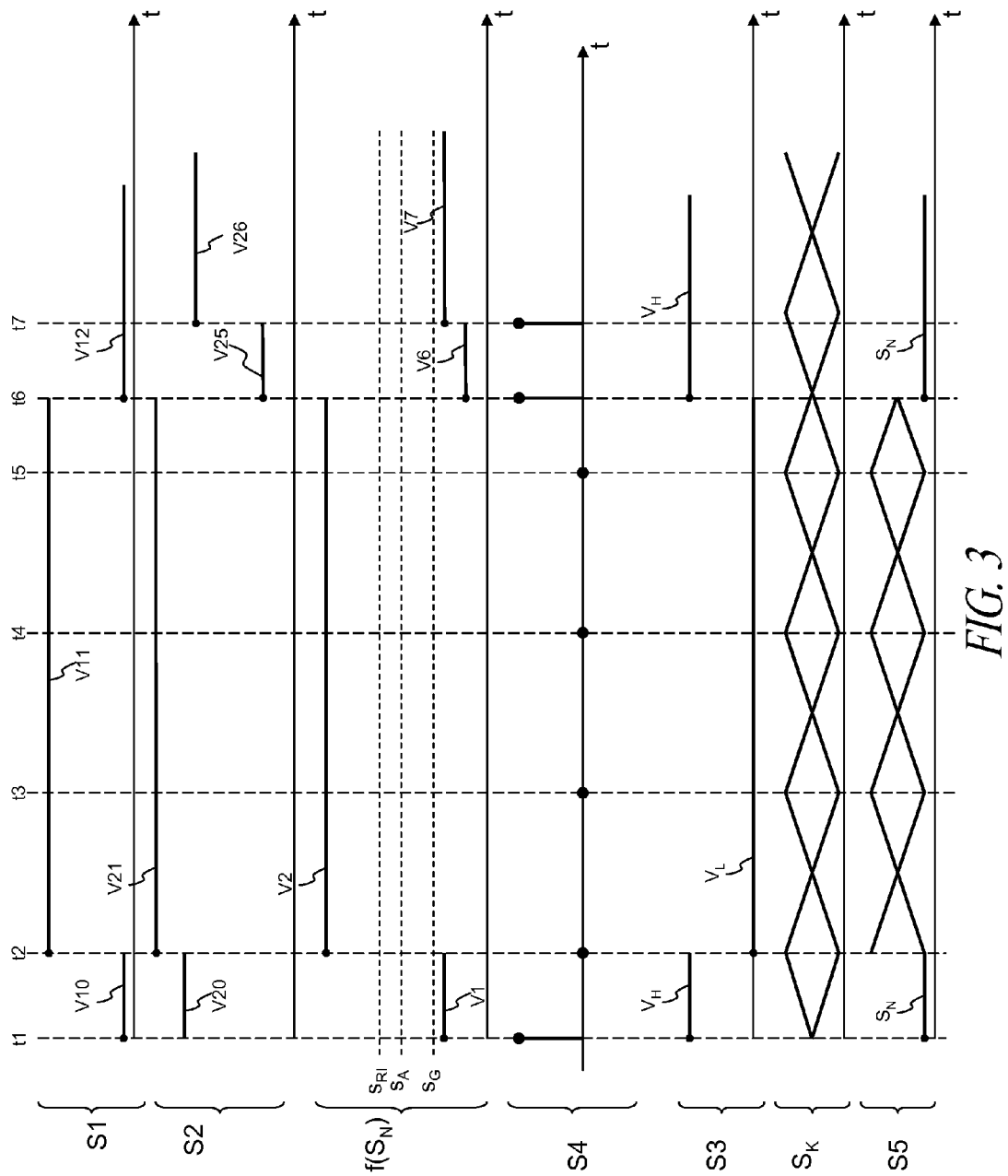
FIG. 3 schematically shows the trend of some signals in the electronic device according to an embodiment of the disclosure.

FIG. 3 shows a variant of the first example embodiment of the disclosure. At the time $t_2$ the controller 4 detects that the bit switching rate $f(S_N)$ assumes the value $V_2$ greater than the interference detection threshold $S_{RI}$ and provides to the amplifier 2 the gain control signal S4 which keeps the gain value of the amplifier 2 constant at times $t_3$, $t_4$, $t_5$, thus also the amplified radio-frequency signal S2 at the same times keeps the same value V21.

When at the time $t_6$ the high-power interference signal disappears (or fades considerably), the controller 4 detects that the bit switching rate $f(S_N)$ assumes a value $V_6$ lower than the interference fading threshold $S_A$ and then the controller 4 switches from the shutdown mode 111 to the normal operation mode 110, similar to what disclosed in the first embodiment of the disclosure.

This variant has the advantage that, since the gain of the amplifier 2 is kept constant during the shutdown mode 111, part of the circuits which carry out the gain control of the amplifier 2 can be switched off, thereby reducing the power consumption.

Figure 4:
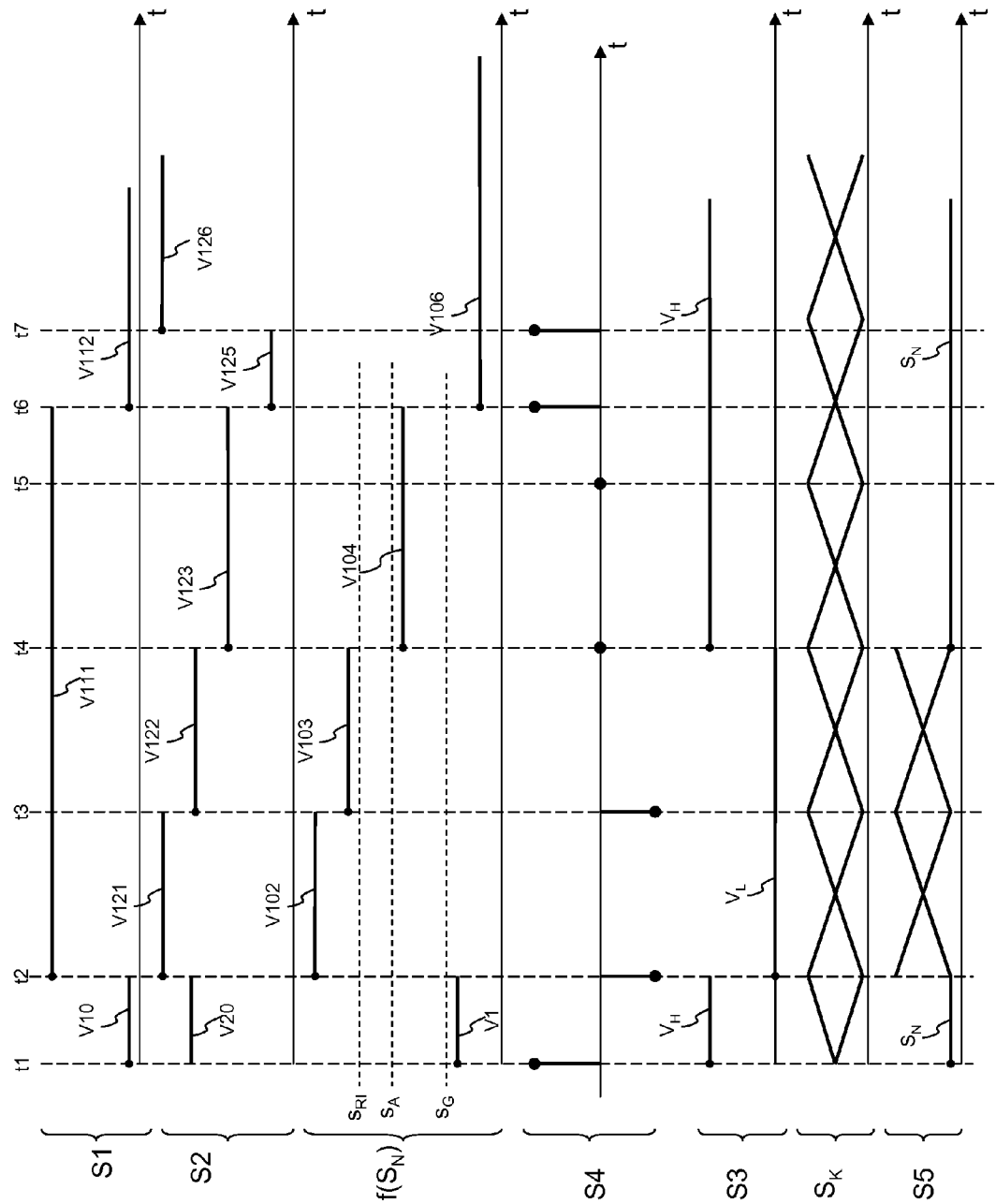
FIG. 4 schematically shows the trend of some signals in the electronic device according to an embodiment of the disclosure.

FIGS. 4 and 6B show a second example embodiment of the disclosure, wherein the controller 4 has also a constant-gain operation mode.

The operation of the electronic device 1 at times $t_1$, $t_2$, $t_3$ of the second embodiment of the disclosure is similar to that of FIG. 2 of the first embodiment of the disclosure and it is graphically shown with the state diagram of FIG. 6B with the arrow indicated again with 104 for the instant $t_1$, the arrow indicated again with 101 for the instant $t_2$ and the arrow indicated again with 103 for the instant $t_3$.

At the time $t_4$ the controller 4 detects that the bit switching rate $f(S_N)$ assumes a value $V_{104}$ lower than the interference fading threshold $S_A$ and greater than the gain threshold $S_G$. The controller 4 switches from the shutdown mode 211 to the constant-gain operation mode 212: this is shown in the state diagram in FIG. 6B, wherein the arrow 205 is present which indicates a transition from the state 211 with a shutdown mode to the state 212 with the constant-gain operation mode, when it occurs the condition (indicated with $f(S_N)<S_A$ AND $f(S_N)>S_G$) that the value of the bit switching rate $f(S_N)$ is lower than the interference fading threshold $S_A$ and greater than the gain threshold $S_G$.

In the shutdown mode 211 and in the condition wherein the value of the bit switching rate $f(S_N)$ is lower than the interference fading threshold $S_A$ and is greater than the gain threshold $S_G$, the controller 4 provides to the amplifier 2 the gain control signal S4 to keep constant the value of the gain of the amplifier 2 (schematically shown in FIG. 4 with a sample of S4 with a value equals to zero) and thus at the subsequent time $t_5$ the amplified radio-frequency signal S2 keeps the same value $V_{123}$ of the previous time $t_4$. Moreover, the controller 4 generates a high value $V_H$ of the selection signal S3 and the selector 5 selects the digital signal $S_N$ as the selected signal S5 on its output 16. Therefore in the second embodiment of the disclosure "interference condition" means the detection by the controller 4 of the value of the digital measure greater than or equal to the interference detection threshold $S_{RI}$, while "non-interference condition" means the detection by the controller 4 of the value of the digital measure lower than the interference fading threshold $S_A$ and greater than the gain threshold $S_G$.

At the time $t_5$ the controller 4 continues to detect that the bit switching rate $f(S_N)$ is assuming the value $V_{104}$ lower than the interference fading threshold $S_A$ and greater than the gain threshold $S_G$. Therefore the controller 4 remains in the constant-gain operation mode 212 (arrow 208 in FIG. 6B) and has a behavior similar to that of the previous time $t_4$.

Therefore in the second embodiment of the disclosure it can be observed that, when the bit switching rate $f(S_N)$ has a lower value than the fading threshold $S_A$ and greater than the gain threshold $S_G$, the gain of the amplifier 3 remains constant and, moreover, the digital signal $S_N$ is transmitted from the radio-frequency module 20 to the base-band module 30. This has the advantage of bringing the electronic device 1 back to a state of operation with a degraded performance, which allows to the base-band module 30 to correctly detect a part of the information carried by the useful signal included into the radio-frequency signal S1.

When the controller 4 detects at time $t_6$ (wherein the interference signal disappears or fades considerably) that the bit switching rate $f(S_N)$ assumes a value V106 lower than the gain threshold $S_G$, the controller 4 switches from the constant-gain operation mode 212 to the normal operation mode 210 (arrow 207 in FIG. 6B), wherein it has the operation explained above for the first embodiment; in particular, the controller 4 starts again to provide to the amplifier 2 the gain control signal S4 in order to increase or decrease the gain of the amplifier 2 (FIG. 4 shows the case wherein at the time $t_6$ the sample of signal S4 has a positive value to increase the gain).

Figure 5:
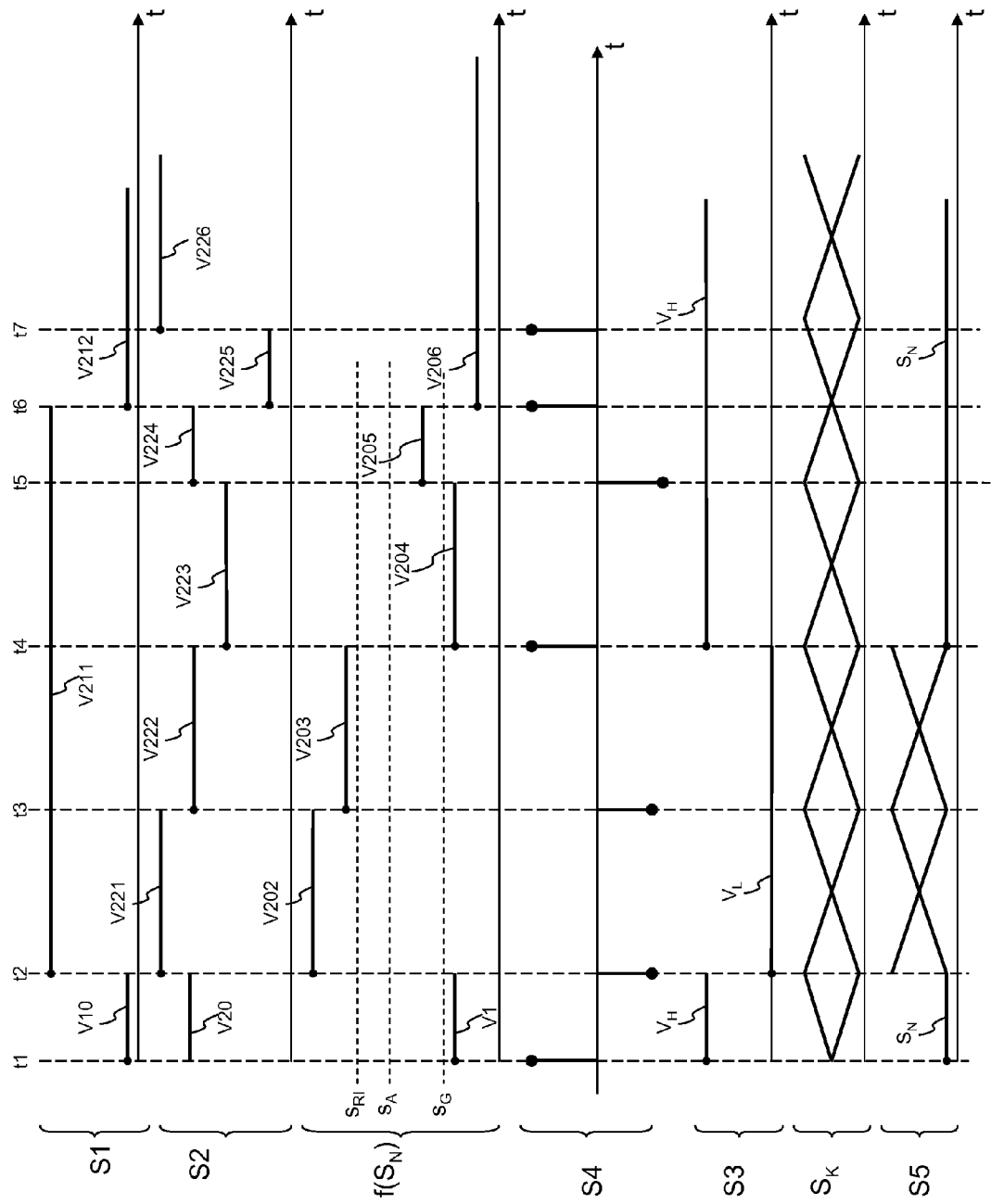
FIG. 5 schematically shows the trend of some signals in the electronic device according to an embodiment of the disclosure.

FIG. 5 shows a variant of the first or second embodiments of the disclosure. The controller 4 detects at the time $t_4$ that the bit switching rate $f(S_N)$ is assuming the value V204 lower than the gain threshold $S_G$ and the controller 4 switches from the shutdown mode 111 or 211 to the normal operation mode 110 or 210 (arrow 202 of FIG. 6B), wherein it has the same operation as at time $t_6$ previously explained for the first or second embodiments. This situation can occur, for example, when the power of the interference signal is not too high and thus the reduction of the gain of amplifier 2 (times $t_3$, $t_4$) is sufficient to bring the electronic device back to the normal operation state 110 or 210, wherein the base-band module 30 correctly detects the information carried by the useful signal included in the radio-frequency signal S1. It can be observed that starting from time $t_4$ (wherein the controller is back to the normal operation mode 110 or 210) the controller 4 provides the gain control signal S4 which increases the gain of amplifier 2 when the bit switching rate of the digital signal $S_N$ is lower than the value of the gain threshold $S_G$ and decreases the gain of amplifier 2 when the value of the bit switching rate of the digital signal $S_N$ is greater than or equal to the value of the gain threshold $S_G$.

In an embodiment, the bits considered for calculating the bit switching rate of the digital signal $S_N$ in the normal operation mode are different from the bits considered for the calculation of the bit switching rate of the bits of the digital signal $S_N$ in the shutdown mode. For example, it is supposed that the digital signal $S_N$ in output from the analog-to-digital 3 is quantized with 3 bits, indicated with $S_N[2]$, $S_N[1]$, $S_N[0]$, wherein $S_N[2]$ is the most significant bit and $S_N[0]$ is the least significant bit. Let's consider the first embodiment of the disclosure with the diagram with the two states 110, 111 shown in FIG. 6A: in this example, the controller 4 in the normal operation mode carries out a first digital measure $f'(S_N[1])$ counting in a determined time interval the number of times wherein the bit $S_N[1]$ is equal to the high logic value (i.e., "1") and compares the value of the first digital measure $f'(S_N[1])$ with respect to the interference detection threshold $S_{RI}$ (arrow 101 in FIG. 6A), while the controller 4 in the shutdown mode carries out a second digital measure $f''(S_N[2])$ counting in a determined time interval the number of times wherein the bit $S_N[2]$ is equal to the high logic value (i.e., "1") and compares the value of the second digital measure $f''(S_N[2])$ with respect to the interference fading threshold $S_A$.

This has the advantage that the interference detection threshold may be used both in the normal operation mode and in the shutdown mode, avoiding at the same time to carry out the transition from the shutdown mode to the normal operation mode in case of an interference signal oscillating between high and low intensity, in a short time interval. Moreover the choice of different bits allows to detect more quickly the presence of interference signals, by choosing the most appropriate bit of the digital signal $S_N$.

Analogously, the bits considered for calculating the bit switching rate of the digital signal $S_N$ in the normal operation mode can be different from the bits used for calculating the bit switching rate of the digital signal $S_N$ in the constant-gain operation mode, and/or the bits considered for calculating the bit switching rate of the digital signal $S_N$ in the shutdown mode can be different from the bits used for calculating the bit switching rate of the digital signal $S_N$ in the constant-gain operation mode.

In an embodiment, the transition from the normal operation mode to the shutdown mode (time t2 of FIGS. 2-5) occurs when the controller 4 detects that the value of the bit switching rate $f(S_N)$ is greater than the interference detection threshold $S_{RI}$ at least for two subsequent time intervals: this has the advantage of avoiding to enter the shutdown step in case false interference signals and/or short-term interference signals are received.

Figure 7:
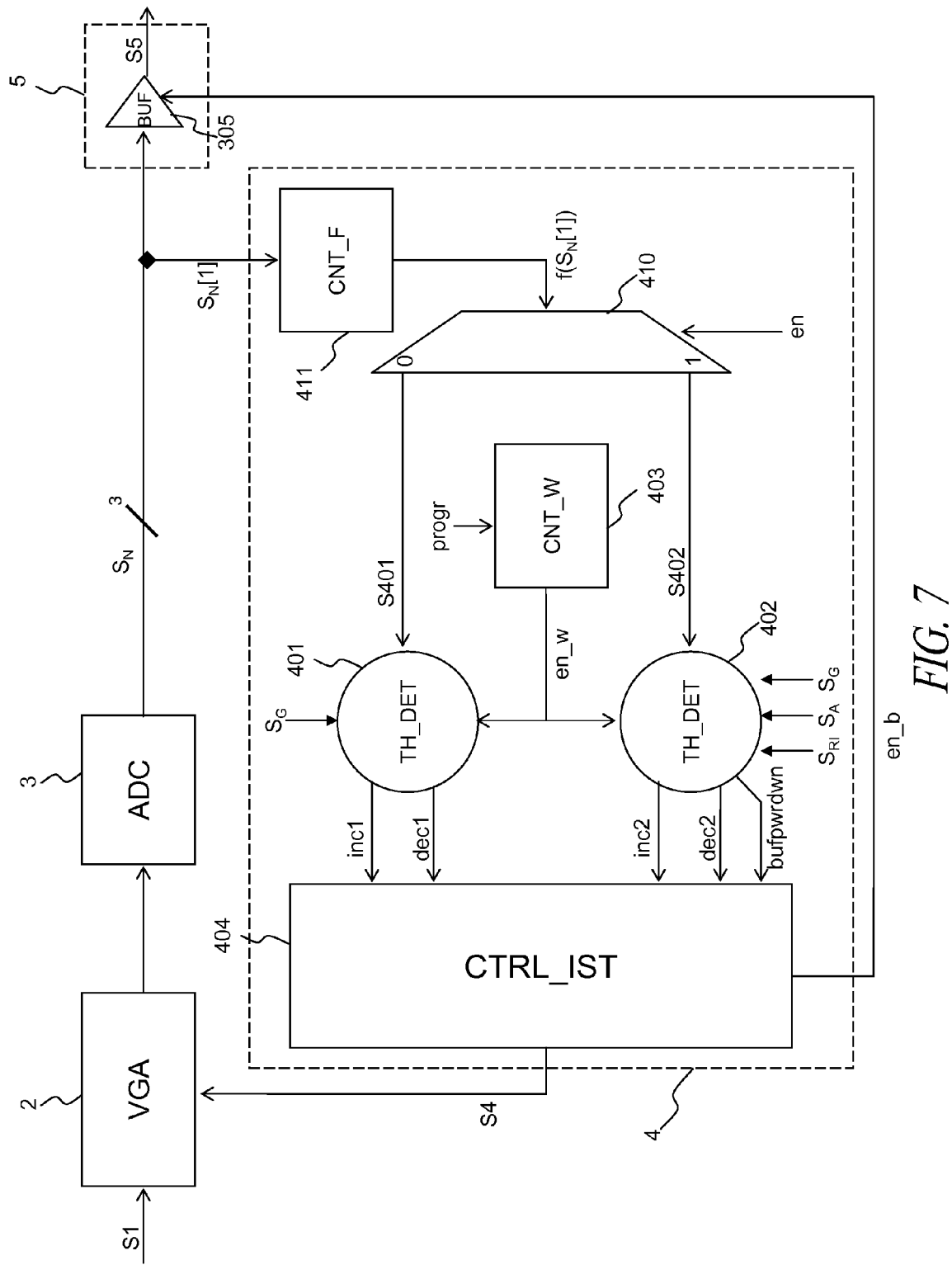
FIG. 7 schematically shows a possible implementation of an embodiment of a controller according to the disclosure.

FIG. 7 shows a first possible implementation of the controller 4 according to the disclosure.

The controller 3 comprises the following blocks, which are connected by means of input/output terminals as shown in FIG. 7:

a counter 411;
a demultiplator 410;
a first threshold detector 401;
a second threshold detector 402;
a hysteresis controller 404;
a window counter 403.

The counter 411, the demultiplator 410, the first threshold detector 401, the second threshold detector 402, the hysteresis controller 404 and the window counter 403 may be configured to implement, for example, the state machine 100 in FIG. 6A or the state machine 200 in FIG. 6B.

FIG. 7 also shows that the selector 5 is implemented in an embodiment with a buffer 305 which comprises a first input terminal to receive an enable signal en_b, a second input terminal to receive the digital signal $S_N$ and an output terminal to transmit the digital signal $S_N$ in case the value of the enable signal en_b is equal to the high logic value and to transmit the replacement signal $S_K$ having low logic values (i.e., a string like "00000 . . . ") in case the value of the enable signal en_b is equal to the low logic value.

The counter 411 receives on the input terminal the bit in position 1 (indicated with $S_N[1]$) of the 3-bit digital signal $S_N$, calculates the bit switching rate (indicated with $f(S_N[1])$) counting the number of times wherein the bit in position 1 of the digital signal $S_N$ is equal to the high logic value (i.e., "1") and transmits on the output terminal the counting value indicated with $f(S_N[1])$.

The selector 410 receives on the first input terminal said counting value $f(S_N[1])$, receives on the second input terminal another enable signal en, transmits on the first output terminal the signal S401 having said counting value $f(S_N[1])$ in case the logic value of the enable signal en is low and transmits on the second output terminal the signal S402 having said counting value $f(S_N[1])$ in case the logic value of the enable signal en is high.

The window counter 403 receives on the input terminal a programming signal progr indicating a time interval within which the counting of the number of times wherein the digital signal $S_N$ is equal to the high logic value (i.e., "1") is to be carried out and generates on the output terminal a window-enable signal en_w having a high logic value within said time interval and low outside.

The first threshold detector 401 receives on a first input terminal the value of the gain threshold $S_G$, receives on a second input terminal the window enable signal en_w, receives on a third input terminal the signal S401 having said counting value $f(S_N[1])$, carries out (in the time interval indicated by the enable signal en_w) a comparison between the value of said counting signal $f(S_N[1])$ and the value of the gain threshold $S_G$, transmits on the first output terminal the signal inc1 having a high logic value in case the value of the counting signal $f(S_N[1])$ is lower than the gain threshold $S_G$ and having a low logic value in case the value of the counting signal $f(S_N[1])$ is greater than or equal to the gain threshold $S_G$, and transmits on the second output terminal the signal dec1 having a high logic value in case the value of the counting signal $f(S_N[1])$ is greater than the gain threshold $S_G$ and having a low logic value in case the value of the counting signal $f(S_N[1])$ is lower than or equal to the gain threshold $S_G$.

The second threshold detector 402 receives on the first input terminal the value of the gain threshold $S_G$, receives on the second input terminal the enable signal en_w, receives on the third input terminal the signal S402 having said counting value $f(S_N[1])$, carries out (in the time interval indicated by the enable signal en_w) a comparison between the value of said counting signal $f(S_N[1])$ and the value of said gain threshold $S_G$ (similarly to what disclosed above in the description of the operation of the first and second embodiments of the disclosure and in the variants), transmits on the first output terminal the signal inc2 having a high logic value in case the value of the counting signal $f(S_N[1])$ is lower than the gain threshold $S_G$ and having a low logic value in case the value of the counting signal $f(S_N[1])$ is greater than or equal to the gain threshold $S_G$, and transmits on the second output terminal the signal dec2 having a high logic value in case the value of the counting signal $f(S_N[1])$ is greater than the gain threshold $S_G$ and having a low logic value in case the value of the counting signal $f(S_N[1])$ is lower than or equal to the gain threshold $S_G$.

Moreover, the second threshold detector 402 receives on the fourth input terminal the value of the interference detection threshold $S_{RI}$, receives on the fifth input terminal the value of the interference fading threshold $S_A$ and generates therefrom on the third output terminal the logic signal bufpwrdwn indicating the presence of the interference signal, similarly to what previously disclosed for the signal S3 in the description of the operation of the first and second embodiment of the disclosure and in the variants.

The hysteresis controller 404 receives on the first input terminal the signal inc1, receives on the second input terminal the signal dec1, receives on the third input terminal the signal inc2, receives on the fourth input terminal the signal dec2 and generates on the first output terminal the signal S4 to increase, decrease or keep constant the gain value of the amplifier 2.

Moreover, the hysteresis controller 404 receives in the fifth input terminal the logic signal bufpwrdwn and generates on the second output terminal the signal en_b having a high logic value to enable the buffer 305 to transmit on its output terminal the digital signal $S_N$ and having a low logic value for disabling the buffer 305 from the transmission on its output terminal of the digital signal $S_N$: in the last case the buffer 305 transmits the replacement signal $S_K$, which is a bit sequence with low logic values (i.e., "00000 . . . ").

It is to be observed that in the first implementation of the controller 4 a bit (the one in position 1) of the digital signal $S_N$ is used for calculating the bit switching rate and that a counter (411) is used for calculating the bit switching rate: said counter 411 is shared (by means of the demultiplator 410) between the first threshold detector 401 and the second threshold detector 402.

Figure 8:
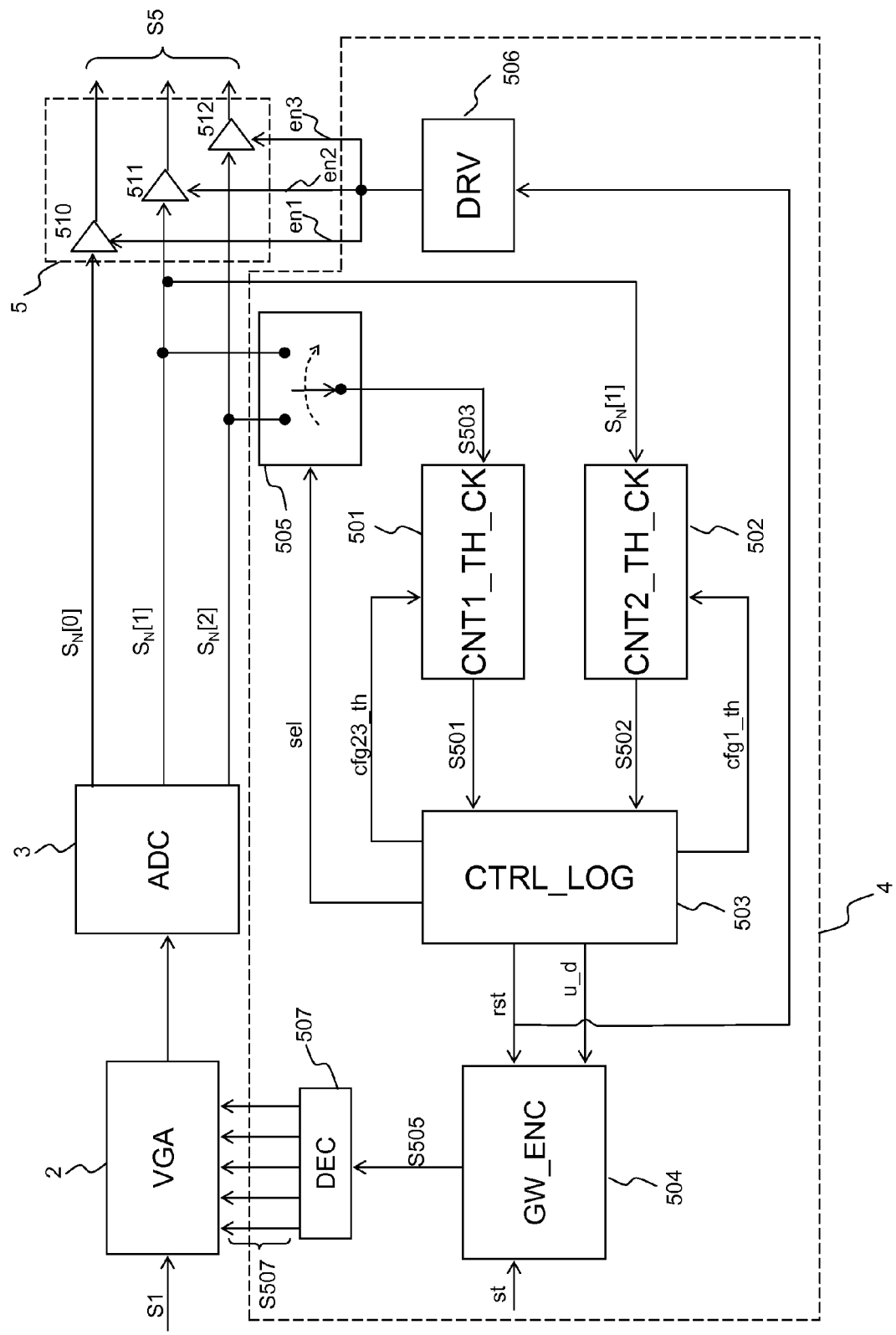
FIG. 8 schematically shows another possible implementation of an embodiment of a controller according to the disclosure.

FIG. 8 shows a second possible implementation of the controller 4 according to the disclosure.

The controller 4 comprises the following blocks, which are connected by means of input/output terminals as shown in FIG. 8:
 a switch 505;
 a first counter/detector 501;
 a second counter/detector 502;
 a control logic 503;
 a gain-word encoder 504;
 a drive module 506; and
 a decoder 507.

The switch 505, the first counter/detector 501, the second counter/detector 502, the control logic 503, the gain-word coder 504, the decoder 507 and the drive module 506 may be configured, for example, to implement the state machine 100 of FIG. 6A or the state machine 200 of FIG. 6B.

FIG. 8 also shows that the selector 5 may be implemented with the following blocks:
 a first buffer 510 which comprises a first input terminal to receive a first enable signal en1, a second input terminal to receive the bit 0 (indicated with $S_N[0]$) of the digital signal $S_N$ and an output terminal to transmit the bit 0 of the digital signal $S_N$ in case the value of the first enable signal en1 is equal to the high logic value or to transmit the bit in position 0 of the replacement signal $S_K$ having low logic values in case the value of the enable signal en1 is equal to the low logic value;
 a second buffer 511 which comprises a first input terminal to receive a second enable signal en2, a second input terminal to receive the bit 1 (indicated with $S_N[1]$) of the digital signal $S_N$ and an output terminal to transmit the bit 1 of the digital signal $S_N$ in case the value of the second enable signal en2 is equal to the high logic value or to transmit the bit in position 1 of the replacement signal $S_K$ having low logic values in case the value of the second enable signal en2 is equal to the low logic value; and a third buffer 512 which comprises a first input terminal to receive a third enable signal en3, a second input terminal to receive the bit 2 (indicated with $S_N[2]$) of the digital signal $S_N$ and an output terminal to transmit the bit 2 of the digital signal $S_N$ in case the value of the third enable signal en3 is equal to the high logic value or to transmit the bit in position 2 of the replacement signal $S_K$ having a low logic value in case the value of the third enable signal en3 is equal to the low logic value.

The switch 505 receives on the input terminal the bit 1 $S_N[1]$ of the digital signal $S_N$, receives on the second input terminal the bit 2 $S_N[2]$ of the digital signal $S_N$, receives on the third input terminal a selection signal sel and transmits on the output terminal the signal S503 by switching between the bit 1 $S_N[1]$ of the digital signal $S_N$ or the bit 2 $S_N[2]$ of the digital signal $S_N$, as a function of the value of the selection signal sel.

The first counter/detector 501 receives on the first input terminal the signal cfg23_th indicating the value of the interference detection threshold $S_{RI}$ and the fading threshold $S_A$, receives on the second input terminal the switched signal S503, calculates the bit switching rate $f(S_N[1], S_N[2])$ counting the number of times wherein the bit in position 1 and 2 of the digital signal $S_N$ is equal to the high logic value (i.e., '1'), carries out (in the time interval indicated by the enable signal, similar to the enable signal en_w of FIG. 7) a comparison between the value of said counting signal $f(S_N[1], S_N[2])$ and the values of the interference detection threshold $S_{RI}$ and the fading threshold $S_A$, transmits on the output terminal the signal S501 having a high or low logic value according to the comparison between the value of the counting signal $f(S_N[1], S_N[2])$ and the values of the interference detection threshold $S_{RI}$ and the fading threshold $S_A$.

The second counter/detector 502 receives on the first input terminal the signal cfg1_th indicating the gain threshold $S_G$, receives on the second input terminal the bit 1 $S_N[1]$ of the digital signal $S_N$, calculates the bit switching rate $f(S_N[1])$ counting the number of times wherein the bit in position 1 of the digital signal $S_N$ is equal to the high logic value, carries out (in the time interval indicated by the enable signal, similar to the enable signal en_w of FIG. 7) a comparison between the value of said counting signal $f(S_N[1])$ and the value of the gain threshold $S_G$, transmits on the output terminal the signal S502 having a high or low logic value as a function of the comparison between the value of the counting signal $f(S_N[1])$ and the value of the gain threshold $S_G$.

The control logic 503 receives on the first input terminal the signal S501 and generates therefrom the logic signal rst indicating the presence of the interference signal (similarly to what disclosed above for the signal S3 in the description of the operation of the first and second embodiments of the disclosure and in the variants), and receives on the second input terminal the signal S502 and generates therefrom the signal u_d for increasing or decreasing the gain of amplifier 2.

The gain-word encoder 504 receives on the first terminal the signal st indicating the starting gain of the amplifier 2, receives on the second terminal the logic signal rst, receives on the third terminal the signal u_d and generates therefrom a bit word S505 indicating the desired gain for the amplifier 2.

The decoder 507 receives the signal S505 and generates therefrom a plurality of signals S507 for driving the several stages of the amplifier 2, in order to configure the desired gain.

The drive module 506 receives the logic signal rst and generates therefrom the first, the second and the third enable signals en1, en2, en3, to drive the first, the second and the third buffers 510, 511, 512 respectively.

It is to be observed that in the second implementation of the controller 4 different bits are used in respect to the digital signal $S_N$ for calculating the bit switching rate and two counters (501, 502) are used in order to calculate the respective bit switching rate.

In an embodiment of the present disclosure, a method comprises the steps of:
carrying out a digital measure on the digital signal $S_N$;
generating, from the digital signal $S_N$, the selection signal S3 having the first value ($V_H$) indicating the non-interference condition in the radio-frequency signal S1 and having the second value ($V_L$) indicating the interference condition in the radio-frequency signal S1.

In an embodiment, the step of carrying out the measure of the power of the digital signal and the step of generating the selection signal S3 comprise the following steps:
detecting that the value of the digital measure is greater than or equal to the interference detection threshold and generating therefrom the second value ($V_L$);
detecting that the digital measure is lower than or equal to the interference fading threshold and generating therefrom the first value ($V_H$).

The steps of the method according to the disclosure can be implemented by a software program comprising the software code and implemented in the controller 4, which can be a separate micro-processor or it can be a microprocessor within a specific or programmable integrated circuit (for example a FPGA=Field Programmable Gate Array). The programming language used for the software program code can be, for example C or VHDL (Very high-speed integrated circuit Hardware Description Language) or Verilog.

In an embodiment, the electronic device according to the disclosure is implemented in a signal receiver for satellite navigation and location, as for example GPS-type signals.

In an embodiment, the signal receiver for satellite navigation and location (for example, GPS-type) is implemented in an integrated circuit.

In an embodiment, the electronic device according to the disclosure is implemented in a radio-mobile signal receiver.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device comprising:
  an analog-to-digital converter configured to receive a radio-frequency signal and to generate therefrom a digital signal;
  a controller configured to measure a characteristic of the digital signal and to generate therefrom a selection signal having a first value indicating a non-interference condition in the radio-frequency signal and having a second value indicating an interference condition in the radio-frequency signal; and
  a selector configured to transmit the digital signal when the selection signal has the first value and configured to transmit a signal replacing the digital signal when the selection signal has the second value, wherein:
    when a value of the measured characteristic is greater than or equal to an interference detection threshold, the controller is configured to set the selection signal to the second value; and
    when the value of the measured characteristic is smaller than an interference fading threshold, the controller is configured to set the selection signal to the first value, wherein the interference detection threshold is greater than the interference fading threshold.

2. The electronic device according to claim 1 wherein: the measured characteristic is a power of the digital signal.

3. The electronic device according to claim 2, further comprising:
  a variable gain amplifier configured to receive another radio-frequency signal and a gain control signal and to generate therefrom the radio-frequency signal according to the gain control signal, wherein the controller is further configured to generate the gain control signal.

4. The electronic device of claim 3, wherein when the value of the measured power of the digital signal is greater than or equal to the interference detection threshold, the controller is configured to generate the gain control signal to reduce a gain of the variable gain amplifier.

5. The electronic device according to claim 3, wherein when the value of the measured measured power of the digital signal is greater than or equal to the interference detection threshold, the controller is configured to:
  store a gain value of the variable gain amplifier; and
  generate the gain control signal for keeping the gain of the variable gain amplifier equal to the stored gain value.

6. The electronic device according to claim 1 wherein the controller is configured to measure the characteristic by measuring a switching rate of at least one bit of the digital signal in a defined time period.

7. The electronic device according to claim 1 wherein the replacement signal is a pre-defined signal.

8. The electronic device of claim 1, further comprising:
  a global positioning module.

9. The electronic device of claim 8, wherein the electronic device is implemented in an integrated circuit.

10. An electronic device comprising:
  an analog-to-digital converter configured to receive a radio-frequency signal and to generate therefrom a digital signal:
  a controller configured to measure a power of the digital signal and to generate a selection signal having a first value indicating a non-interference condition in the radio-frequency signal and having a second value indicating an interference condition in the radio-frequency signal;
  a selector configured to transmit the digital signal in case the selection signal has the first value and configured to transmit a signal replacing the digital signal in case the selection signal has the second value, the signal replacing the digital signal indicating an interference condition; and
  a variable gain amplifier configured to receive another radio-frequency signal and a gain control signal and to generate therefrom the radio-frequency signal according to the gain control signal, wherein,
    the controller is configured to generate the gain control signal;
    the controller is configured to generate the selection signal based on the measured power of the digital signal, an interference detection threshold and an interference fading threshold; and
  when a value of the measured power of the digital signal is smaller than the interference fading threshold, the controller is configured to:
    generate the selection signal to the selector to select the digital signal; and
    generate the gain control signal to control the gain of the variable gain amplifier, by increasing the gain of the amplifier if the measured power of the digital signal is smaller than a gain threshold and decreasing the gain of the amplifier if the measured power of the digital signal is higher than the gain threshold, wherein the gain threshold is smaller than the interference fading threshold and the interference fading threshold is smaller than the interference detection threshold.

11. The electronic device of claim 10 wherein:
  the interference condition occurs when a value of the measured power of the digital signal is greater than or equal to the interference detection threshold; and
  the non-interference condition occurs when the value of the measured power of the digital signal is smaller than the interference detection threshold.

12. An electronic device comprising:
  an analog-to-digital converter configured to receive a radio-frequency signal and to generate therefrom a digital signal;
  a controller configured to measure a power of the digital signal and to generate a selection signal having a first value indicating a non-interference condition in the radio-frequency signal and having a second value indicating an interference condition in the radio-frequency signal;
  a selector configured to transmit the digital signal in case the selection signal has the first value and configured to transmit a signal replacing the digital signal in case the selection signal has the second value, the signal replacing the digital signal indicating an interference condition; and
a variable gain amplifier configured to receive another radio-frequency signal and a gain control signal and to generate therefrom the radio-frequency signal according to the gain control signal, wherein,
the controller is configured to generate the gain control signal;
the controller is configured to generate the selection signal based on the measured power of the digital signal, an interference detection threshold and an interference fading threshold; and
when a value of measured power of the digital signal is smaller than the interference fading threshold and greater than the gain threshold, the controller is configured to:
generate the selection signal to the selector to select the digital signal; and
generate the gain control signal to keep constant the gain of the variable gain amplifier.

13. An electronic device comprising:
an analog-to-digital converter configured to receive a radio-frequency signal and to generate therefrom a digital signal;
a controller configured to measure a power of the digital signal and to generate a selection signal having a first value indicating a non-interference condition in the radio-frequency signal and having a second value indicating an interference condition in the radio-frequency signal;
a selector configured to transmit the digital signal in case the selection signal has the first value and configured to transmit a signal replacing the digital signal in case the selection signal has the second value, the signal replacing the digital signal indicating an interference condition; and
a variable gain amplifier configured to receive another radio-frequency signal and a gain control signal and to generate therefrom the radio-frequency signal to the gain control signal, wherein,
the controller is configured to generate the gain control signal;
the controller is configured to generate the selection signal based on the measured power of the digital signal, an interference detection threshold and an interference fading threshold; and
when a value of the measured power of the digital signal is smaller than a gain threshold, the controller is configured to:
generate the selection signal to the selector to select the digital signal; and
generate the gain control signal for controlling the gain of the variable gain amplifier, by increasing the gain of the amplifier if the value of the measured power of the digital signal is smaller than the gain threshold and decreasing the gain of the amplifier if the value of the measured power of the digital signal is higher than the gain threshold.

14. An electronic device, comprising:
an analog-to-digital converter configured to receive a radio-frequency signal and to generate therefrom a digital signal;
a controller configured to:
measure a first switching rate of at least one bit of the digital signal;
measure a second switching rate of at least one different bit of the digital signal;
compare the first switching rate with an interference detection threshold;
compare the second switching rate with an interference fading threshold; and
generate a selection signal indicating an interference condition or a non-interference condition based on the comparisons; and
a selector configured to transmit the digital signal when the selection signal indicates the non-interference condition and to transmit a replacement signal when the selection signal indicates the interference condition.

15. The electronic device according to claim 14, further comprising:
a variable gain amplifier configured to receive another radio-frequency signal and a gain control signal and to generate therefrom the radio-frequency signal according to the gain control signal, wherein the controller is further configured to generate the gain control signal.

16. The electronic device according to claim 14, further comprising:
a base-band module configured to receive the digital signal or the replacement signal transmitted by the selector, wherein the controller is further configured to generate an interrupt signal when the selection signal indicates the interference condition and wherein the base-band module is configured to receive the interrupt signal.

17. A system, comprising:
a base-band module; and
a radio-frequency module comprising:
means for converting a radio-frequency signal to a digital signal;
means for detecting an interference condition in the radio-frequency signal based on the digital signal and generating a selection signal based on whether the interference condition is detected; and
means for transmitting one of the digital signal and a replacement signal to the base-band module based on the selection signal.

18. The system of claim 17 wherein the means for detecting is configured to measure a power of the digital signal and generate the selection signal based on the measured power and an interference detection threshold.

19. The system of claim 18 wherein the means for detecting is configured to generate the selection signal based on the measure power, the interference detection threshold and an interference fading threshold.

20. The system of claim 17, further comprising:
a variable gain amplifier coupled to the means for converting and configured to receive an input radio-frequency signal and a gain control signal and to output the radio-frequency signal, wherein the means for detecting is further configured to generate the gain control signal.

21. The system of claim 17 wherein the replacement signal is a configured signal.

22. The system of claim 17, further comprising:
means for determining a global position.

23. A method, comprising:
converting a radio-frequency signal to a digital signal;
determining a digital measure based on the digital signal;
detecting an interference condition or a non-interference condition in the radio-frequency signal based on the digital measure;
when the non-interference condition is detected, transmitting the digital signal; and when the interference condition is detected, transmitting a replacement signal indicating detection of the interference condition, wherein the detecting comprises generating a selection signal based on the digital measure, an interference detection threshold and an interference fading threshold;

when a value of the digital measure is greater than or equal to the interference detection threshold, setting the selection signal to a value indicating the interference condition is detected; and when the value of the digital measure is smaller than the interference fading threshold, setting the selection signal to a value indicating the non-interference condition is detected, wherein the interference detection threshold is greater than the interference fading threshold.

24. The method of claim 23 wherein the determining a digital measure comprises measuring a power of the digital signal and the detecting comprises comparing the measured power to the interference detection threshold.

25. The method of claim 24 wherein the detecting further comprises comparing the measured power to the interference fading threshold.

26. The method of claim 23, further comprising:
amplifying the radio-frequency signal prior to converting the radio-frequency signal to the digital signal; and
controlling a gain of the amplification.

27. The method of claim 26 wherein controlling the gain comprises reducing the gain when the interference condition is detected.

28. The method of claim 26 wherein controlling the gain comprises maintaining a previous gain when an interference condition is detected.

29. The method of claim 26 wherein controlling the gain comprises:
measuring at least one characteristic of the digital signal; and
generating a gain control signal based on the at least one measured characteristic, the interference detection threshold and a gain threshold.

30. The method of claim 29 wherein the generating the gain control signal is based on the at least one measured characteristic, the interference detection threshold, the gain threshold and the interference fading threshold.

31. The method of claim 23, further comprising:
detecting whether the replacement signal was transmitted; and
when the replacement signal was not transmitted, demodulating the transmitted signal.

32. The method of claim 23, comprising:
determining the digital measure by:
measuring a first switching rate of at least one bit of the digital signal; and
measuring a second switching rate of at least one different bit of the digital signal;
comparing the first switching rate with the interference detection threshold; and
comparing the second switching rate with the interference fading threshold.

33. A non-transitory computer-readable memory medium storing instructions which, when executed by at least one processing device, configure the at least one processing device to perform a method, the method comprising:
converting a radio-frequency signal to a digital signal;
determining a digital measure based on the digital signal;
detecting an interference condition or a non-interference condition in the radio-frequency signal based on the digital measure; and
transmitting one of the digital signal and a replacement signal based on whether the interference condition or the non-interference condition is detected, the replacement signal indicating detection of the interference condition, wherein the detecting comprises generating a selection signal based on the digital measure, an interference detection threshold and an interference fading threshold;

when a value of the digital measure is greater than or equal to the interference detection threshold, setting the selection signal to a value indicating the interference condition is detected; and when the value of the digital measure is smaller than the interference fading threshold, setting the selection signal to a value indicating the non-interference condition is detected, wherein the interference detection threshold is greater than the interference fading threshold.

34. The non-transitory computer-readable memory medium of claim 33 wherein
the determining the digital measure comprises measuring a power of the digital signal; and
the detecting comprises comparing the measured power to the interference detection threshold.

35. The non-transitory computer-readable memory medium of claim 33 wherein the method further comprises:
amplifying the radio-frequency signal prior to converting the radio-frequency signal to the digital signal; and
controlling a gain of the amplification based on whether the interference condition or the non-interference condition is detected.

36. The non-transitory computer-readable medium of claim 33 wherein the method comprises:
determining the digital measure by:
measuring a first switching rate of at least one bit of the digital signal; and
measuring a second switching rate of at least one different bit of the digital signal;
comparing the first switching rate with the interference detection threshold; and
comparing the second switching rate with the interference fading threshold.

37. A system, comprising:
a converter configured to receive a radio-frequency signal and to generate a digital signal;
a selector coupled to the converter and configured to transmit one of the digital signal and a replacement signal based on a control signal, the replacement signal indicating an interference condition in the radio-frequency signal; and
a controller configured to measure a characteristic of the digital signal and to generate the control signal based on the measured characteristic, wherein
when a value of the measure characteristic is greater than or equal to an interference detection threshold, the control signal is set to a value indicating the interference condition is detected; and
when the value of the digital measure is smaller than an interference fading threshold, the control signal is set to a value indicating interference is not detected, wherein the interference detection threshold is greater than the interference fading threshold.

38. The system of claim 37 comprising a base-band module, wherein the base-band module is configured to detect the interference condition in response to the replacement signal.

* * * * *

UNITED STATES PATENT AND TRADEMARK OFFICE
CERTIFICATE OF CORRECTION

| | | |
|---|---|---|
| PATENT NO. | : 8,582,702 B2 | Page 1 of 1 |
| APPLICATION NO. | : 12/825278 | |
| DATED | : November 12, 2013 | |
| INVENTOR(S) | : Giuseppe Avellone et al. | |

It is certified that error appears in the above-identified patent and that said Letters Patent is hereby corrected as shown below:

In the Claims

Column 22, Lines 9-10:
"radio-frequency signal and to generate there from a digital signal:" should read, --radio-frequency signal and to generate therefrom a digital signal:--.

Column 23, Line 40:
"generate therefrom the radio-frequency signal to the" should read, --generate therefrom the radio-frequency signal according to the--.

Column 25, Line 32:
"comprises maintaining a previous gain when an interference" should read, --comprises maintaining a previous gain when the interference--.

Signed and Sealed this
Eighth Day of April, 2014

Michelle K. Lee
*Deputy Director of the United States Patent and Trademark Office*